United States Patent [19]

Veronesi et al.

[11] Patent Number: 4,857,264
[45] Date of Patent: Aug. 15, 1989

[54] FRICTIONALLY LOADED TOP END SUPPORTS FOR CANTILEVER-MOUNTED ROD GUIDES OF A PRESSURIZED WATER REACTOR

[75] Inventors: Luciano Veronesi, O'Hara Township, Allegheny County; Larry A. Shockling, Plum Borough, both of Pa.

[73] Assignee: Westinghouse Electric Corp., Pittsburgh, Pa.

[21] Appl. No.: 55,590

[22] Filed: May 29, 1987

Related U.S. Application Data

[63] Continuation-in-part of Ser. No. 926,302, Nov. 3, 1986.

[51] Int. Cl.$^4$ .............................................. G21C 1/01
[52] U.S. Cl. ..................................... 376/353; 376/463
[58] Field of Search ............... 376/285, 353, 362, 363, 376/364, 446, 448, 449, 463

[56] References Cited

U.S. PATENT DOCUMENTS

| | | | |
|---|---|---|---|
| 3,425,905 | 2/1969 | Greenhalgh et al. | 376/363 |
| 3,481,832 | 12/1969 | Rickert | 376/399 X |
| 3,816,245 | 6/1974 | Bevilacqua | 376/353 X |
| 3,915,793 | 10/1975 | Andersson et al. | 376/353 X |
| 4,134,790 | 1/1979 | Bevilacqua et al. | 376/364 |
| 4,298,434 | 11/1981 | Anthony et al. | 376/364 |
| 4,304,635 | 12/1981 | Lippert et al. | 376/448 |
| 4,416,848 | 11/1983 | Feutrel | 376/353 X |
| 4,563,328 | 1/1986 | Steinke | 376/353 X |
| 4,584,168 | 4/1986 | Formanek | 376/353 |
| 4,687,628 | 8/1987 | Gillett et al. | 376/353 |
| 4,707,331 | 11/1987 | Sherwood et al. | 376/353 |

FOREIGN PATENT DOCUMENTS 98774 1/1984 European Pat. Off. ............ 376/353

Primary Examiner—Deborah L. Kyle
Assistant Examiner—Richard Klein
Attorney, Agent, or Firm—D. C. Abeles

[57] ABSTRACT

A pressurized water reactor of an advanced design comprises, in vertically spaced relationship, a lower barrel assembly having lower and upper core plates, an inner barrel assembly and an axially removable calandria assembly having a lower calandria plate. A plurality of rod guides are cantilever-mounted in parallel axial relationship within the inner barrel assembly by rigidly mounting the lower ends thereof to the upper core plate. Axially extending sleeves affixed to the upper ends of the rod guides and telescopingly receive therein generally cylindrical supports which are affixed to and depend downwardly from the lower calandria plate and define alignment axes for the respectively associated rod guides. Axially extending leaf springs in each sleeve are normally biased radially inwardly and, in the assembled relationship of the calandria and inner barrel assemblies, resiliently and frictionally engage the respective cylindrical supports to maintain alignment and react both lateral and axial loads. Load pick-up surfaces of non-yielding sleeve portions react excessive loads directly into the lower calandria plate. Mating top end supports for RCC and WDRC rod guides permit dense packing of same, while internal openings of the top end supports permit telescoping movement of the corresponding rod clusters therethrough to permit ease of assembly and disassembly operations.

36 Claims, 10 Drawing Sheets

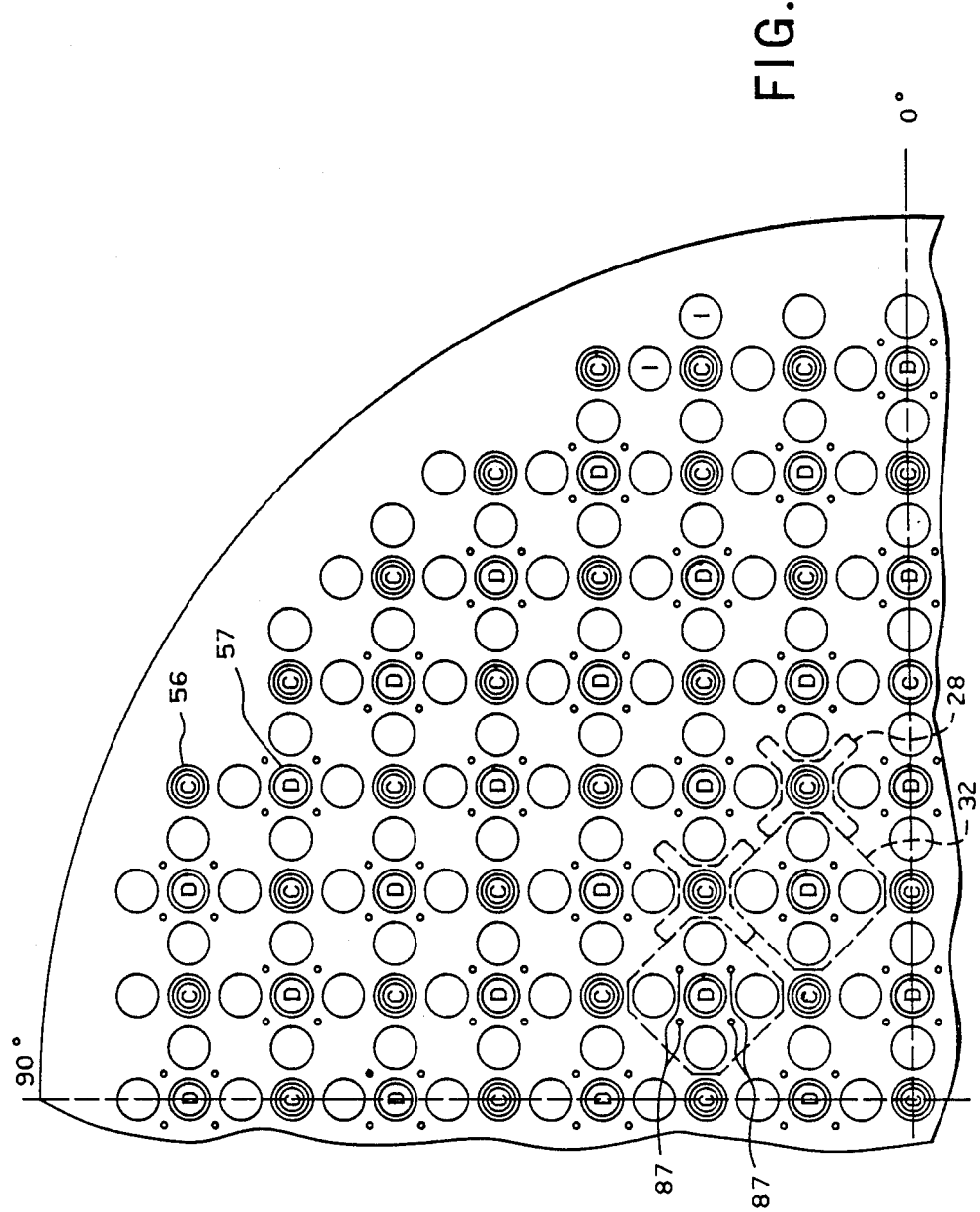

FRICTIONALLY LOADED TOP END SUPPORTS FOR CANTILEVER-MOUNTED ROD GUIDES OF A PRESSURIZED WATER REACTOR

This is a continuation-in-part of application Ser. No. 926,302, filed Nov. 3, 1986, and entitled "FRICTIONALLY LOADED TOP END SUPPORT FOR CANTILEVER-MOUNTED WATER DISPLACEMENT ROD GUIDES OF A PRESSURIZED WATER REACTOR," of L. Veronesi, a co-applicant herein.

BACKGROUND OF THE INVENTION

1. Field of the Invention

This invention relates to the pressure vessel of a pressurized water reactor system of an advanced design in which plural rod guides are cantilever-mounted at their lower ends and extend in parallel, vertical relationship to dispose the upper ends thereof adjacent a calandria assembly or other removable support and, more particularly, to improved, frictionally loaded top end supports for such rod guides.

2. State of the Relevant Art

Conventional pressurized water reactors employ a number of control rods which are mounted within the reactor vessel, generally in parallel axial relationship, for axial translational movement in telescoping relationship with the fuel rod assemblies. The control rods contain materials which absorb neutrons and thereby lower the neutron flux level within the core. Adjusting the positions of the control rods relatively to the respectively associated fuel rod assemblies thereby controls and regulates the reactivity and correspondingly the power output level of the reactor. Typically, the control rods, or rodlets, are arranged in clusters, and the rods of each cluster are mounted at their upper ends to a common, respectively associated spider. Each spider, in turn, is connected through a drive rod to a respectively associated adjustment mechanism for raising or lowering the associated rod cluster.

In certain advanced designs of such pressurized water reactors, there are employed both control rod clusters (RCC's) and water displacement rod clusters (WDRC's), and also so-called gray rod clusters which, to the extent here relevant, are structurally identical to the RCC's and therefore both are referred to collectively hereinafter as RCC's. In an exemplary such reactor design, a total of over 2800 reactor control rods and water displacer rods are arranged in 185 clusters; typically, the rods of each cluster are individually mounted to a respectively corresponding spider. Further, there are provided, at successively higher, axially aligned elevations within the reactor vessel, a lower barrel assembly, an inner barrel assembly and a calandria assembly, each of generally cylindrical configuration; a removable, upper closure dome seals the top of the vessel and is removable to gain access to the vessel interior.

The lower barrel assembly has mounted therein, in parallel axial relationship, a plurality of fuel rod assemblies comprising the reactor core. The fuel rod assemblies are supported at the lower and upper ends thereof, respectively, by corresponding lower and upper core plates. The inner barrel assembly comprises a cylindrical sidewall which is welded at its bottom edge to the upper core plate. Within the inner barrel assembly there are mounted a large number of rod guides disposed in closely spaced relationship, in an array extending substantially throughout the cross-sectional area of the inner barrel assembly. The rod guides are of first and second types, respectively housing therewithin the reactor-control rod clusters (RCC's) and the water displacer rod clusters (WDRC's); these clusters, as received in telescoping relationship within their respectively associated guides, generally are aligned with respectively associated fuel rod assemblies.

One of the main objectives of the advanced design, pressurized water reactors to which the present invention is directed, is to achieve a significant improvement in the fuel utilization efficiency, resulting in lower overall fuel costs. Consistent with this objective, the water displacement rodlet clusters (WDRC's) function as a mechanical moderator and provide spectral shift control of the reactor. Typically, a fuel cycle is of approximately 18 months, following which the fuel must be replaced. When initiating a new fuel cycle, all of the WDRC's are fully inserted into association with the fuel rod assemblies, and thus into the reactor core. As the excess reactivity level of the fuel diminishes over the cycle, the WDRC's, in groups, are withdrawn progressively from the core so as to enable the reactor to maintain the same reactivity level even though the reactivity level of the fuel rod assemblies is reducing due to dissipation over time. Conversely, the control rod clusters are moved, again in axial translation and thus telescoping relationship relatively to the respectively associated fuel rod assemblies but on a continuing basis, for control of the reactivity and correspondingly the power output level of the reactor, for example in response to load demands, in a manner analogous to conventional reactor control operations.

A reactor incorporating WDRC's is disclosed in application Ser. No. 946,111, filed Dec. 24, 1986, a continuation of Ser. No. 217,053, filed Dec. 16, 1980 and entitled "MECHANICAL-SPECTRAL SHIFT REACTOR" and in further applications cited therein. A system and method for achieving the adjustment of both the RCC's and WDRC's are disclosed in the co-pending application Ser. No. 806,719, filed Dec. 9, 1985 of Altman et al. and entitled "VENT SYSTEM FOR DISPLACER ROD DRIVE MECHANISM OF PRESSURIZED WATER REACTOR AND METHOD OF OPERATION." Each of the foregoing applications is assigned to the common assignee hereof and is incorporated herein by reference.

A critical design criterion of such advanced design reactors is to minimize vibration of the reactor internal structures, as may be induced by the core outlet flow as it passes therethrough. A significant factor for achieving that criterion is to maintain the core outlet flow in an axial direction throughout the inner barrel assembly of the pressure vessel and thus in parallel axial relationship relative to the rod clusters and associated rod guides. The significance of maintaining the axial flow condition is to minimize the exposure of the rod clusters to cross-flow, a particularly important objective due both to the large number of rods and also to the type of material required for the WDRC's, which creates a significant wear potential. This is accomplished by increasing the vertical length, or height, of the vessel sufficiently such that the rods, even in the fully withdrawn (i.e., raised) positions within their inner barrel assembly, remain located below the vessel outlet nozzles, whereby the rods are subjected only to axial flow, and through the provision of a calandria assembly, which is disposed above the inner barrel assembly and thus above the level of the rods and which is constructed to withstand the cross-flow conditions.

In general, the calandria assembly comprises a lower calandria plate and an upper calandria plate which are joined by a cylindrical side wall, and an annularly flanged cylinder which is joined at its lower cylindrical end to the upper calandria plate and is mounted by its upper, annularly flanged end on an annular supporting ledge of the pressure vessel. The rod guides are semi-permanently, cantilever-mounted at their lower ends to the upper core plate and releasably affixed at their upper ends to the lower calandria plate. Within the calandria assembly and extending between aligned apertures in the lower and upper calandria plates is mounted a plurality of calandria tubes, positioned in parallel axial relationship and respectively aligned with the rod guides. A number of flow holes are provided in the lower calandria plates, at positions displaced from the apertures associated with the calandria tubes, through which the reactor core outlet flow passes as it exits from its upward passage through the inner barrel assembly. The calandria assembly receives the axial core outlet flow, and turns the flow from the axial direction through 90° to a radially outward direction for passage through the radially oriented outlet nozzles of the vessel. The calandria thus withstands the cross-flow generated as the coolant turns from the axial and upward to the radial and outward directions, and provides for shielding the flow distribution in the upper internals of the vessel. Advanced design pressurized water reactors of the type here considered incorporating such a calandria assembly are disclosed in the co-pending applications: Ser. No. 490,101 to James E. Kimbrell et al., for "NUCLEAR REACTOR"; application Ser. No. 490,059 to Luciano Veronesi for "CALANDRIA"; and application Ser. No. 490,099, "NUCLEAR REACTOR", all thereof concurrently filed on Apr. 29, 1983 and incorporated herein by reference.

As before noted, the rod guides for each of the RCC and WDRC rod clusters are mounted securely and semi-permanently at their bottom ends to the upper core plate, preferably by being bolted thereto, and extend in parallel axial relationship to dispose the upper, free ends thereof adjacent the lower calandria plate. This cantilever-type mounting is necessitated to accommodate both axial (i.e., vertical) movement of the free ends of the rod guides, which occurs due to thermal expansion and thus axial elongation of the rod guides, and also fixed end motion, which is caused by vibration and/or flexing of the upper core plate to which the bottom, fixed ends of the rod guides are mounted. Because of these factors, it is not possible to rigidly and permanently secure the free, upper ends of the rod guides to the lower calandria plate. For example, routine refueling and maintenance operations performed on such reactors require disassembly of major components including removal of the head assembly, the calandria assembly and the inner barrel assembly to gain access to the core for replacing or relocating fuel rod assemblies, as required.

Inspection and replacement, as required, of other components usually is performed in conjunction with refueling; accordingly, the calandria assembly typically is removed from within the inner barrel assembly, necessitating separation of the rod guides from the lower calandria plate. This most readily is accomplished by providing support structures or mounting means for the upper ends of the rod guides, which means are secured to the lower calandria plate and releasably engage and support the top ends of the rod guides, preferably without the use of special tools. Despite being releasable, the mounting means for the upper, free ends of the rod guides not only must constrain the same against lateral motion, caused by flow-induced vibration and flow and thermal forces imposed thereon while nevertheless accommodating the aforedescribed axial movement of the free ends of the rod guides, but also must avoid excessive wear of the reactor internals.

In some existing designs and as in conventional reactors, split pins are employed at the free ends of the rod guides for restricting lateral motion while permitting a limited extent of axial motion; such designs, however, present wear concerns. In fact, due to the high loads and large axial motion of the free ends in the advanced design pressure vessels, the use of split pins for the free end supports is deemed not practical.

There thus exists a substantial need for a top end support structure for the top, free ends of the rod guides in such advanced design reactors, which satisfies these complex structural and operational requirements but which is of simple design and small physical size and employs a minimum number of parts, thereby to achieve cost economies, both in the cost of components and in the size of the reactor vessel and also in simplifying and thereby expediting the performance of maintenance operations on such reactors and correspondingly reducing down-time. Moreover, in view of the different configurations of the rod guides which accommodate the respective, different rod cluster types, respectively corresponding such top support structures of different configurations are required which are mutually compatible.

CROSS-REFERENCE TO RELATED APPLICATIONS

The co-pending application Ser. No. 798,194, filed Nov. 14, 1985, of D. G. Sherwood et al., entitled "TOP END SUPPORT FOR WATER DISPLACEMENT ROD GUIDES OF PRESSURIZED WATER REACTOR", assigned to the common assignee hereof and incorporated herein by reference, discloses a telescoping interconnection between a cylindrical support element which is affixed to and extends downwardly from the lower calandria plate and an apertured sleeve affixed to the top end of each rod guide. The configuration of the telescoping elements maximizes the area of the wear surface, thereby to resist wear during normal operation, while affording ease of removal of the calandria to gain access to the rod clusters and of reassembly of same.

An alternative top end support arrangement is disclosed in the co-pending application of Ekeroth and Veronesi, the latter a common inventor herein, entitled "RESILIENTLY LOADED LATERAL SUPPORTS FOR CANTILEVER-MOUNTED ROD GUIDES OF A PRESSURIZED WATER REACTOR" filed Nov. 3, 1986, Ser. No. 926,301. As disclosed therein, a mount, which may be of cylindrical configuration, is secured to the lower surface of a lower calandria plate and a sleeve is secured to the upper end of a cantilever-mounted rod guide; means are provided for releasably interconnecting the sleeve and the support and for producing resilient, generally lateral (i.e., radially-oriented) loading therebetween. A variety of embodiments are disclosed in which the releasably interconnecting means may comprise links which are either inherently flexible or pivotally connected to the cylindrical support, generally extending downwardly therefrom such that the same are engaged on receiving sockets at the upper end of the sleeve as the calandria assembly is lowered into position. As an alternative to resiliency of the links, in one disclosed embodiment, a rigid link pivotally joined to the cylindrical socket engages a flexibly mounted receiving socket in the sleeve, to achieve the resilient loading effect. In certain disclosed embodiments, moreover, the support and sleeve may have mating surfaces which are nominally spaced by the resilient loading of the releasably interconnecting means and which serve as an abutment stop, or load pick-up surface, when lateral forces imposed on the guide exceed the resilient, lateral loading of the releasable interconnecting means, thereby to translate excessive lateral forces directly to the calandria. While the lateral loading and nominal spacing of contiguous parts, thus afforded, offers the advantage of reduced wear under normal loading conditions, the pivotal interconnection between the fixed support and the sleeve affords little, if any, axially oriented frictional force for restraining axially directed vibrational or translational movement of the rod guide, or of the lower and upper support plates with which it is associated (i.e., the upper core plate and the lower calandria plate). Moreover, the receiving socket structures required in the upper end of the sleeves encumber the requisite openings therein through which the respective rod clusters must pass during disassembly and assembly procedures.

Yet another alternative top end support assembly is disclosed in U.S. Pat. No. 4,687,628 issued Aug. 18 1987 from the previously co-pending application Ser. No. 923,059, filed Oct. 24, 1986, a continuation of parent application Ser. No. 798,220, filed Nov. 14, 1985, of Gillett et al. entitled "FLEXIBLE ROD GUIDE SUPPORT STRUCTURE FOR INNER BARREL ASSEMBLY OF PRESSURIZED WATER REACTOR", assigned to the common assignee hereof and incorporated herein by reference. Respective, differently configured top support plates are mounted on the free ends of the RCC and the WDRC rod guides, respectively, and have mating, respective exterior and interior vertices to permit assemblage of same in an interdigitized array. Flexible linkages connect the top plates in a concatenated relationship, and serve to restrain relative, lateral movement while permitting relative axial movement therebetween. Stop pins are received in aligned bores of the contiguous interdigitized top plates and serve to limit the extent of load which can be applied to the linkages and thus the ultimate extent of relative movement between the concatenated top plates. The RCC top plates include openings, preferably of cylindrical configuration, which receive corresponding cylindrical extensions which are secured to and extend downwardly from the lower calandria plate, thereby establishing basic alignment of the concatenated and interleaved matrices of the plates. Leaf springs secured to the calandria bottom plate engage and exert a downward force on the top surfaces of the RCC top plates, thereby establishing a frictional force which further opposes lateral movement of the RCC top plates and, through the concatenated and interleaved arrangement, correspondingly opposes any lateral movement of the WDRC top plates, as well, while permitting restrained axial displacement or movement of the individual RCC and WDRC rod guides. While the flexible support structure of the referenced Gillett et al. application satisfies many of the requirements of the rod guide top end supports, the structure is of complex design and requires the use of numerous elements, contributing to increased costs of construction and maintenance of the reactor.

Accordingly, there remains a need for a lateral support for the top, free ends of the cantilever-mounted rod guides of the pressurized water nuclear reactors of the advanced designs herein contemplated, which is of simplified design and reduced cost, yet which affords the requisite support functions while reducing and/or substantially eliminating wear concerns.

SUMMARY OF THE INVENTION

In accordance with the present invention, frictionally loaded top end supports are provided at the interface between the upper, free ends of cantilever-mounted rod guides, respectively housing control rod clusters (RCC's) and water displacement rod clusters (WDRC's), and a support plate disposed thereabove. In the specific embodiment herein disclosed relating to a pressurized water reactor of the advanced design type, the support plate comprises the lower calandria plate of a calandria assembly. While the frictionally loaded top end supports of the invention are directed to overcoming the particular problems presented by such advanced design pressurized water reactors, it will be appreciated that they may be employed in other reactors for satisfying alignment and lateral support requirements for the top ends of rod guides, even though the further concerns of vibration and axial movement of the rod guides are not as severe, or not present in the first instance.

More particularly in accordance with the present invention, the frictionally loaded top end supports or mounting means, for each of the RCC and WDRC rod guides, comprise corresponding, generally cylindrical, fixed supports which are secured to the lower calandria plate and extend axially downwardly therefrom, and respectively mating, reinforced sleeves which are affixed to the upper ends of the associated RCC and WDRC rod guides and which define generally cylindrical central openings for receiving the respective, cylindrical fixed supports in telescoping, sliding relationship therein.

Each of the top end supports includes an upper, continuous annular collar portion and a lower, continuous annular base portion integrally interconnected by a generally cylindrical sidewall portion. Plural leaf springs are incorporated in each reinforced sleeve, positioned at angularly displaced locations about the common alignment axis of the cylindrical support and associated rod guide sleeve, e.g., four leaf springs at 90° displaced locations. Each leaf spring has a flexible shank portion extending from a base portion at the lower end of the sleeve to an arcuate segment lip portion adjacent the upper end of the sleeve, the arcuate segments at the upper ends being of a common radius, substantially that of the exterior surface of the fixed cylindrical support, and which are resiliently biased by the shank and base portions in a radially inward direction to bear against same.

The leaf springs present a relatively low preload, thereby inducing only a low frictional load during installation as the cylindrical supports are telescopingly inserted and received into the corresponding cylindrical openings of the sleeves, yet exerts sufficient lateral, resilient force to oppose lateral loads within the typical range experienced in normal operational flow conditions and sufficient axially directed frictional forces to oppose axial, or vertical, movement of the free ends of the rod guides. The continuous, annular collar portion of each sleeve, moreover, presents a non-yielding, load pick-up surface which backs the arcuate segment lip portions of the preload springs and is capable of carrying high lateral loads with low deflections. Thus, high lateral loads, including both those exceeding the typical range in normal operation and those which are produced under accident (e.g., seismic and LOCA) conditions, are transferred from the load pick-up surface of the sleeve directly to the cylindrical support and thus into the calandria. Accordingly, the top end supports of the invention are both compliant so as to afford easy installation and also of sufficient resilient strength to maintain alignment and stability during most normal operating conditions, and yet also are strong and rugged to resist abnormally high lateral forces which can occur during accident conditions.

Because of the dense packing of the RCC and WDRC control rod clusters in the internals of the advanced design reactor vessels, the top end supports correspondingly are densely packed and thus must be of an efficient design and configuration so as to occupy a minimum of space, individually, while satisfying the above-described support functions. In general, each of the RCC clusters has an "X"shaped configuration in cross-section, i.e., four arms extending radially at mutually displaced right angles from a common, central axis, as viewed in a cross-section in a plane perpendicular to the axis, whereas each of the WDRC rod clusters has a periphery of generally square cross-sectional configuration, likewise symmetrically disposed about a central axis. In assembled relationship, the four exterior vertices of each WDRC support are received in mating relationship within corresponding, interior vertices of four surrounding RCC top end supports; likewise, each RCC top end support receives within each of its four interior vertices corresponding exterior vertices of four WDRC top end supports which are disposed thereabout in surrounding relationship. While thus in an interspersed array, the individual RCC and WDRC top end supports are independent of each other, each providing the required support function for its associated rod guide. Because of the greater lateral forces to which the WDRC rod guides are subjected, a more massive fixed cylindrical support is provided for the WDRC top end supports, as compared to the RCC top end supports. Conversely, while the RCC top end supports need only accommodate a lower level of lateral forces and correspondingly have less massive fixed cylindrical supports, a smaller spatial envelope is available in these structures to accommodate the leaf springs. Accordingly, the RCC supports incorporate a retainer pin which is received in a clearance hole in the top, free end of each leaf spring, as an added safety precaution, for capturing the spring in the unlikely event of breakage.

More specifically, with respect to each WDRC top end support, the associated, fixed cylindrical support comprises a cylindrical sidewall and an integral, end closure having a central aperture therein which is aligned with a corresponding aperture in the lower calandria plate for receiving therethrough a drive rod for the WDRC rod cluster associated with the respective WDRC rod guide. Preferably, the upper surface of the end closure includes an annular projection which is received in a corresponding annular recess in the lower calandria plate, coaxial with the drive rod aperture; the calandria extension then is received through the aligned apertures in the lower calandria plate and the end closure, the extension being welded to the plate. The assemblage thus provides directly interlocking interfaces, preventing any lateral displacement. Bolts then are received through corresponding apertures in the end closure and into threaded engagement in the calandria plate, to axially secure the fixed cylindrical support to the calandria plate. Arcuate recesses extend through the end closure of the fixed cylindrical support and complementary recesses extend axially through the cylindrical sidewall of the support and the reinforced sleeve, corresponding to respective flow holes in the lower calandria plate, to assure unimpeded vertical flow from the core and through the inner barrel assembly. Because of the square cross-sectional configuration and larger dimensions of the WDRC support, it is convenient to form the leaf springs by machining the corresponding, major faces of the sleeve, such that the base portion of each spring is integral with the lower, continuous annular base portion of the sleeve and the arcuate segment lip portion is positioned slightly, axially below the annular collar portion. The interior, engaging surface of the arcuate segment lip portion of each spring is biased by the shank portion so as to be positioned nominally radially inwardly of the interior, load pick-up surface of the annular collar portion of the sleeve.

With respect to the RCC top end supports, and recalling the reduced lateral force which the same must withstand but also the smaller spatial envelope of the structure, the fixed cylindrical support comprises solely a calandria extension, similar in configuration to the calandria extension of the WDRC support and likewise extending through and secured to the lower calandria plate. The reinforced sleeve, as before-noted, is of X-shaped configuration, a central portion thereof from which the four, 90°-displaced radially extending arms project, having a generally cylindrical interior of a greater diameter than the external diameter of the calandria extension and thus defining an annular gap therebetween. The leaf springs preferably are formed as separate elements. The base portion of each spring has a flat or planar inner surface, and an arcuate outer surface which matches the interior circumference of the continuous annular base portion of the sleeve, and is secured thereto by bolts which pass through the sleeve sidewall. The shank integrally connects the base portion with the arcuate segment lip portion and positions the latter in the annular gap between the calandria extension and the upper, continuous collar portion of the sleeve; the collar, due to its concentric and surrounding relationship, therefore comprises the non-yielding, load pick-up surface. Retainer pins extend through the collar portion of the sleeve adjacent its upper end and into clearance holes extending radially and partially into the respective, arcuate segment lip portions. The retainer pins thus capture and retain the RCC leaf springs, in the unexpected event of breakage. While structurally different, the RCC top end supports function in substantially the same manner as the WDRC top end supports, the leaf springs presenting relatively low preloads which are readily overcome during assembly and which nevertheless are adequate to resist excessive flow-induced vibration and axial and lateral loads in normal operation. High lateral loads, which exceed the typical range in normal operation and as are experienced during accident conditions, are transferred from the load pick-up surface of the continuous collar portion of the sleeve and through the intervening arcuate lip portion of the correspondingly positioned spring to the calandria extension. Accordingly, the RCC top end support likewise affords a load pick-up surface which is stiff and strong, for transfer of lateral loads of excessive levels and in accident conditions directly to the calandria.

The reinforced sleeves of both the WDRC and RCC top end supports furthermore are machined to define interior, axially extending passageways for the respective RCC and WDRC rod clusters, thereby to enable their removal from within the corresponding rod guides in conjunction with removal of the calandria assembly from the upper internals, without the necessity of structural modification or disassembly of the rod guide top end support structures.

Accordingly, the frictionally loaded, WDRC and RCC top end supports of the present invention function to prevent both lateral and axial displacement and vibrational movement of the associated rod guides as well as axial vibrational movement of the upper core plate, while affording ease of installation and of removal of the calandria assembly and providing the requisite flow paths to the calandria assembly, yet are of a simplified design and employ a minimum number of parts.

These and other advantages of the present invention will become more apparent from the following detailed description, taken with reference to the enclosed figures, in which like reference numerals and letters refer to like parts throughout.

BRIEF DESCRIPTION OF THE DRAWINGS

FIG. 1C is a schematic top plan view of the lower calandria plate, seen in FIG. 1A, illustrating the provision of flow holes and, in hidden lines, the orientation and arrangement of RCC and WDRC rod guides extending axially downwardly below the lower calandria plate;

DETAILED DESCRIPTION OF THE PREFERRED EMBODIMENTS

Figure 1A:
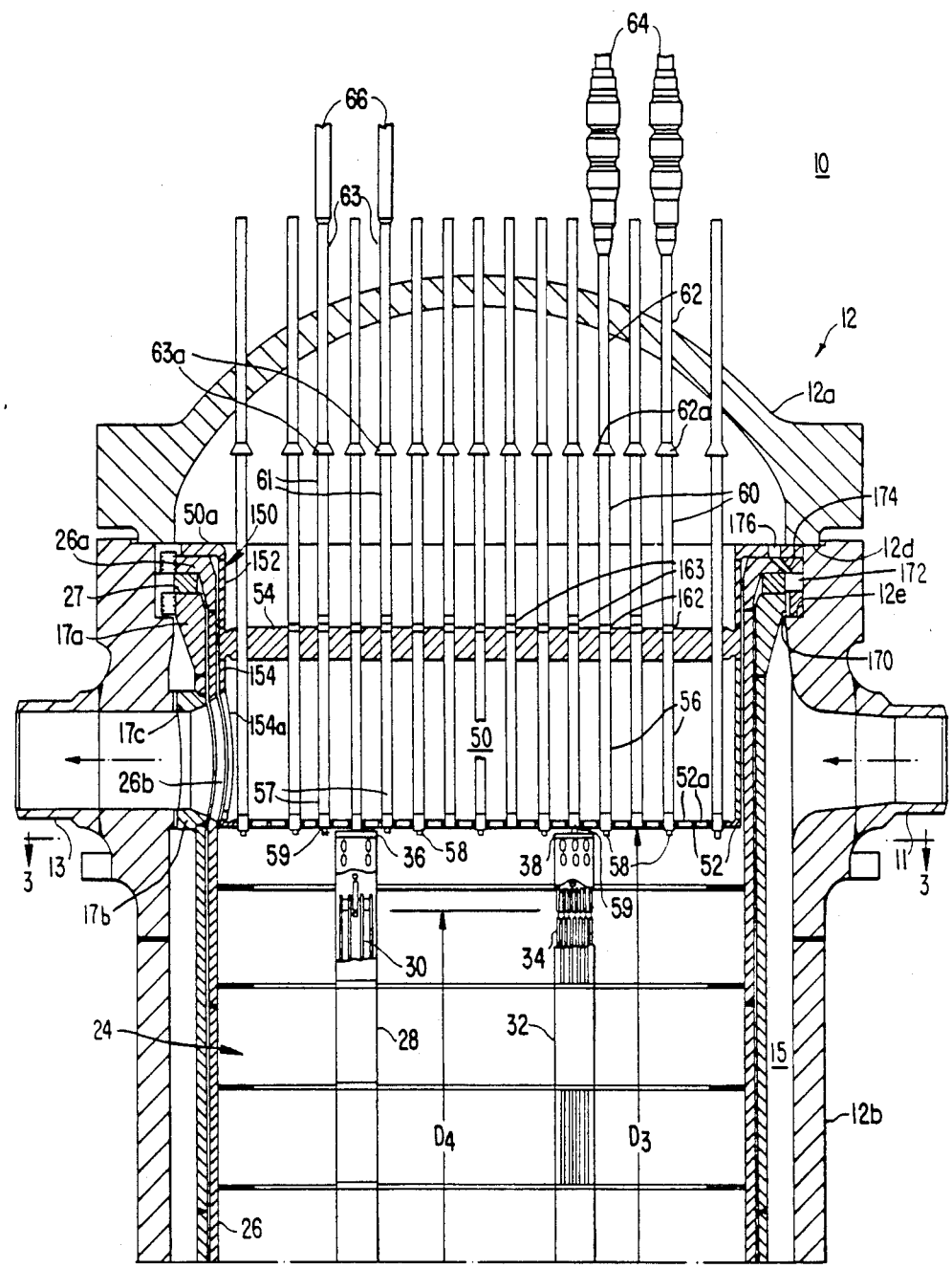
FIGS. 1A and 1B, in the composite, comprise an elevational view, partially in cross-section, of an advanced design, pressurized water reactor of the type with which the frictionally loaded top end support for cantilever-mounted water displacement rod guides in accordance with the present invention are intended to be employed.
Figure 1B:
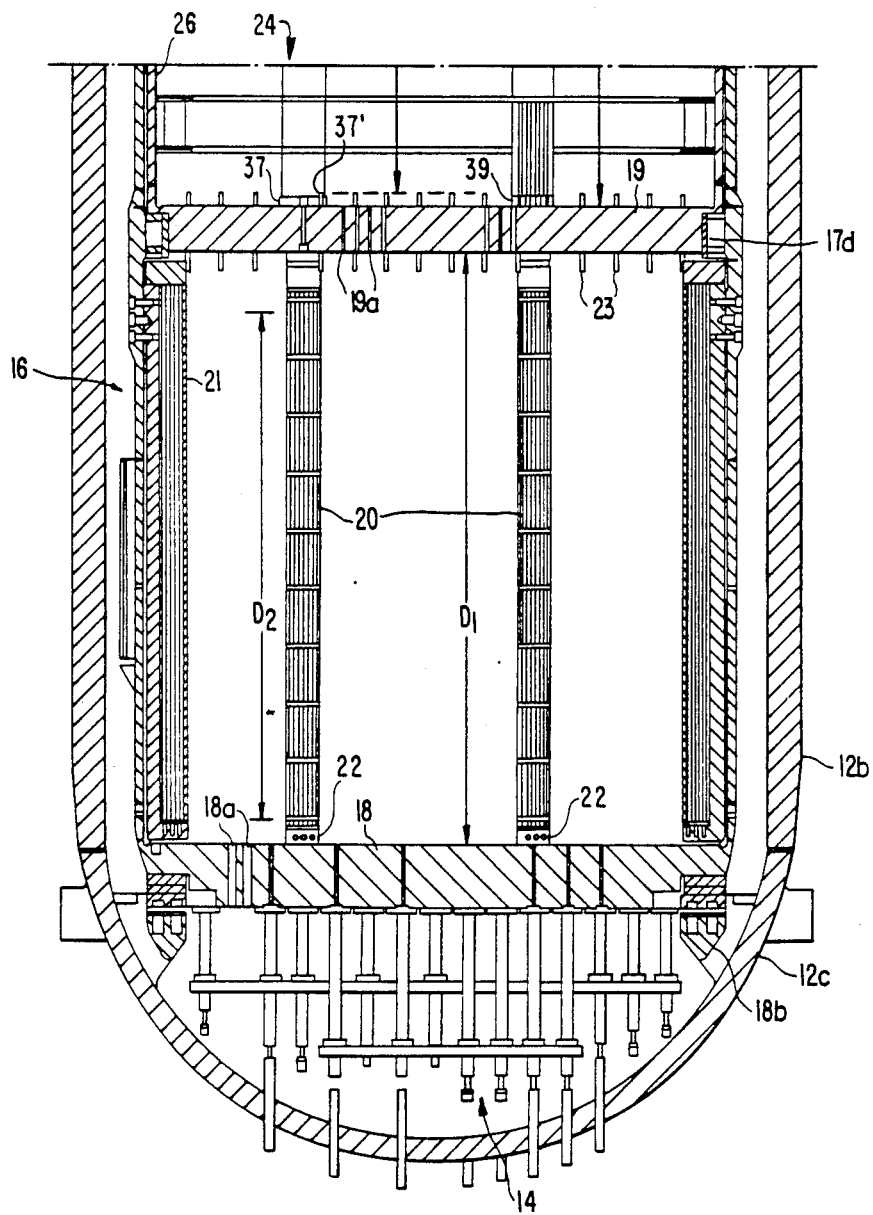

The composite of FIGS. 1A And 1B (referred to hereinafter as FIG. 1) is an elevational view, partly in cross-section, of a pressurized water reactor 10 comprising a pressure vessel 12 including an upper dome, or head assembly, 12a, cylindrical sidewalls 12b, and a bottom closure 12c comprising the base of the reactor 10. Plural radially oriented inlet nozzles 11 and outlet nozzles 13 (only one (1) of each appearing in FIG. 1) are formed in the sidewall 12b, adjacent the upper, annular end surface 12d of the sidewall 12b. Whereas the cylindrical sidewall 12b may be integrally joined, as by welding, to the bottom closure 12c, the head assembly 12a is removably received on the upper, annular end surface 12d of the sidewall 12b and secured thereto. The sidewall 12b further defines an inner, generally annular mounting ledge 12e for supporting various internal structures as later described. Within the bottom closure 12c, as schematically indicated, is so-called bottom-mounted instrumentation 14.

The lower barrel assembly 16 comprises a generally cylindrical sidewall 17 affixed at its lower end to a lower core plate 18, which is received on mounting support 18b, as generally schematically illustrated. The cylindrical sidewall 17 extends substantially throughout the axial height of the vessel 12 and includes an annular mounting ring 17a at the upper end thereof which is received on the annular mounting ledge 12e thereby to support the assembly 16 within the vessel 12. As will be rendered more apparent hereafter, the sidewall 17 is solid in the vicinity of the inlet nozzles 11, but includes an aperture 17b having a nozzle ring 17c mounted therein which is aligned with and closely adjacent to the outlet nozzle 13, for each such nozzle. An upper core plate 19 is supported on a mounting support 17d affixed to the interior surface of the cylindrical sidewall 17 at a position approximately one-half the axial height thereof. Fuel rod assemblies 20 are positioned in generally vertically oriented, parallel axial relationship within the lower barrel assembly 16 by bottom mounts 2 carried by the lower core plate 18 and by pin-like mounts 23 carried by, and extending through, the upper core plate 19. Flow holes 18a and 19a (only two of which are shown in each instance) are provided in predetermined patterns, extending substantially throughout the areas of the lower and upper core plates 18 and 19, respectively. The flow holes 18a permit passage of a reactor coolant fluid into the lower barrel assembly 16 in heat exchange relationship with the fuel rod assemblies 20, which comprise the reactor core, and the flow holes 19a permit passage of the core output flow into the inner barrel assembly 24. A neutron reflector and shield 21 is mounted interiorly of the cylindrical sidewalls 17, in conventional fashion.

The inner barrel assembly 24 includes a cylindrical sidewall 26 which is integrally joined at its lower edge to the upper core plate 19. The sidewall 26 has secured to its upper, open end, an annular mounting ring 26a which is received on an annular hold-down spring 27 and supported along with the mounting ring 17a on the mounting ledge 12e. The sidewall 26 further includes an aperture 26b aligned with the aperture 17b and the output nozzle 13. Within the inner barrel assembly 24, and densely packed within the cylindrical sidewall 26, are positioned a plurality of rod guides in closely spaced, parallel axial relationship; for simplicity of illustration, only two such rod guides are shown in FIG. 1, namely rod guide 28 housing a cluster 30 of radiation control rods (RCC) and a rod guide 32 housing a cluster 34 of water displacement rods (WDRC). The rods of each RCC cluster 30 and of each WDRC cluster 34 are mounted individually to the respectively corresponding spiders 147 and 90. Mounting means 36 and 37 are provided at the respective upper and lower ends of the RCC rod guide 28 and, correspondingly, mounting means 38 and 39 are provided at the respective upper and lower ends of the WDRC rod guide 32. The lower end mounting means 37 and 39 rigidly mount the respective rod guides 28 and 32 to the upper core plate 19, as illustrated for the RCC rod guide mounting means 37 by bolt 37'. The upper mounting means 36 and 38 mount the respective rod guides 28 and 32 to a calandria assembly 50, and particularly to a lower calandria plate 52.

The calandria assembly 50, in more detail, comprises a generally cylindrical, flanged shell 150 formed of a composite of the flange 50a, an upper connecting cylinder 152 which is welded at its upper and lower edges to the flange 50a and to the upper calandria plate 54, respectively, and a lower connecting cylinder, or skirt, 154 which is welded at its upper and lower edges to the upper and lower calandria plates 54 and 52, respectively. The lower connecting cylinder, or skirt, 154 includes an opening 154a aligned with each of the outlet nozzles 13 such that the axial core outlet flow received within the calandria 52 through the openings 52a in the lower calandria plate 52 may turn through 90° and exit radially from within the calandria 52 through the opening 154a to the outlet nozzle 13. The annular flange 50a which is received on the flange 26a to support the calandria assembly 50 on the mounting ledge 12e. Plural, parallel axial calandria tubes 56 and 57 are positioned in alignment with corresponding apertures in the lower and upper calandria plates 53 and 54, to which the calandria tubes 56 and 57 are mounted at their respective, opposite ends.

Extending upwardly beyond the upper calandria plate 54 and, more particularly, within the head assembly 12a of the vessel 12, there are provided plural flow shrouds 60 and 61 respectively aligned with and connected to the plural calandria tubes 56 and 57. A corresponding plurality of head extensions 62 and 63 is aligned with the plurality of flow shrouds 60, 61, the respective lower ends 62a and 63a being flared, or bell-shaped, so as to facilitate assembly procedures and, particularly, to guide the drive rods (not shown in FIG. 1) into the head extensions 62, 63 as the head assembly 12a is lowered onto the mating annular end surface 12d of the vessel sidewall 12b. The flared ends 62a, 63a also receive therein the corresponding upper ends 60a, 61a of the flow shrouds 60, 61 in the completed assembly, as seen in FIG. 1. The head extensions 62, 63 pass through the upper wall portion of the head assembly 12a and are sealed thereto. Control rod cluster (RCC) displacement mechanisms 64 and water displacement rod cluster (WDRC) displacement mechanisms 66 are associated with the respective head extensions 62, 63 flow shrouds 60, 61 and calandria tubes 56, 57 which, in turn, are associated with respective clusters of radiation control rods 30 and water displacement rods 34. The RCC displacement mechanisms (CRDM's) 64 may be of well known type, as are and have been employed with conventional reactor vessels. The displacer mechanisms (DRDM's) 66 for the water displacer rod clusters (WDRC's) 34 may be in accordance with the disclosure of U.S. Letters Pat. No. 4,439,054-Veronesi, assigned to the common assignee hereof.

The respective drive rods (not shown in FIGS. 1A and 1B) associated with the CRDM's 64 and the DRDM's 66 are structurally and functionally the equivalent of elongated, rigid rods extending from the respective CRDM's 64 and DRDM's 66 to the respective clusters of radiation control rods (RCC's) 30 and water displacement rods (WDRC's) 34 and are connected at their lower ends to the spiders 100 and 120. Apertures 58 and 59 in the lower calandria plate accommodate the corresponding drive rods. The CRDM's and DRDM's 64 and 66 thus function through the corresponding drive rods to control the respective vertical positions of, and particularly, selectively to lower and/or raise, the RCC's 30 and the WDRC's 34 through corresponding openings (not shown) provided therefore in the upper core plate 19, telescopingly into or out of surrounding relationship with the respectively associated fuel rod assemblies 20. In this regard, the interior height $D_1$ of the lower barrel assembly 16 is approximately 178 inches, and the active length $D_2$ of the fuel rod assemblies 20 is approximately 153 inches. The interior, axial height $D_3$ is approximately 176 inches, and the extent of travel, $D_4$, of the rod clusters 30 and 34 is approximately 149 inches. It follows that the extent of travel of the corresponding CRDM and DRDM drive rods is likewise approximately 149 inches.

While the particular control function is not relevant to the present invention, insofar as the specific control over the reaction within the core is effected by the selective positioning of the respective rod clusters 30 and 34, it is believed that those skilled in the art will appreciate that moderation or control of the reaction is accomplished in accordance with the extent to which the control rod clusters 30 are inserted into or withdrawn from the core and with the effective water displacement which is achieved by selective positioning of the water displacement rod clusters 34.

The flow of the reactor coolant fluid, or water, through the vessel 10 proceeds, generally, radially inwardly through a plurality of inlet nozzles 11, one of which is seen in FIG. 1, and downwardly through the annular chamber 15 which is defined by the generally cylindrical interior surface of the cylindrical side wall 12b of the vessel 12 and the generally cylindrical surface exterior surface of the sidewall 17 of the lower barrel assembly 16. The flow then reverses direction and passes axially upwardly through flow holes 18a in the lower core plate 18 and into the lower barrel assembly 16, from which it exits through a plurality of flow holes 19a in the upper core plate 19 to pass into the inner barrel assembly 24, continuing in parallel axial flow therethrough and finally exiting upwardly through flow holes 52a in the lower calandria plate 52. Thus, parallel axial flow conditions are maintained through both the lower and inner barrel assemblies 16 and 24.

Within the calandria 50, the flow in general turns through 90° to exit radially from a plurality of outlet nozzles 13 (one of which is shown in FIG. 1). The inlet coolant flow also proceeds into the interior region of the head assembly 12a through perimeter bypass passageways in the mounting flanges received on the ledge 12e. Particularly, a plurality of holes 170, angularly spaced and at a common radius, are formed in the flange 17a and provide axially-directed flow paths from the annular chamber 15 into the annular space 172 intermediate the spring 27 and the interior surfaces of the sidewalls of the vessel 12; further, a plurality of aligned holes 174 and 176 extend through the flanges 26a and 50a, the holes 174 being angularly oriented, to complete the flow paths from the annular space 172 to the interior of the head assembly 12a. The flow of coolant proceeds from the head region through annular downcomer flow paths defined interiorly of certain of the flow shrouds 60, 61 and calandria tubes 56, 57, as later described, from which the head coolant flow exits into the top region of the inner barrel assembly 24, just below the lower calandria plate 52, to mix with the core outlet flow and pass through the calandria 50, exiting from the outlet nozzles 13.

A first plurality of calandria extensions 58 project downwardly from the calandria tubes 56 and connect to corresponding mounting means, or top end supports, 36 for the upper ends, or tops, of the RCC rod guides 28. The top end supports 36 may be in accordance with the structure disclosed in the concurrently filed patent application entitled LATERAL SUPPORT FOR CANTILEVER-MOUNTED ROD GUIDES OF A PRESSURIZED WATER REACTOR Ser. No. 936,301,filed 11-3-86or, alternatively, in the pending patent application entitled FLEXIBLE ROD GUIDE SUPPORT STRUCTURE FOR INNER BARREL ASSEMBLY OF PRESSURIZED WATER REACTOR Ser. No. 798,220 filed 11-14-85 ), both assigned to the common assignee hereof.

A second plurality of calandria extensions 59, in interleaved relationship with the plurality of extensions 58, projects downwardly from the respectively corresponding calandria tubes 56, each extension 59 telescopingly connecting to a corresponding, frictionally loaded top end support mounting means 38 for a WDRC rod guide 32 in accordance with the present invention. As before briefly noted, each of the mounting means 38 for the WDRC rod guides in accordance with the present invention provides a frictionally loaded, telescoping interconnection between the lower calandria plate 52 and the respectively associated WDRC rod guide 32, thereby not only affording axial alignment and lateral support of the top end of the associated, individual WDRC rod guide 32, but also preventing vibration of the rod guide 32 and the upper core plate 19. The calandria extensions 59, moreover, function, in cooperation with and in response to the frictionally loaded mounting means 38, to react seismic forces from the rod guides 32 into the calandria, while accommodating axial height variations arising from structural tolerances and thermal stresses at the interface of the upper ends of the rod guides 32 and the lower calandria plate 52.

FIG. 1C is a schematic, top plan view of the calandria plate 52 indicating in hidden lines the general, outer peripheral configuration of the RCC rod guides 28 and the WDRC rod guides 32. As later explained, threaded holes 87 provide for engaging the top end supports for the WDRC rod guides to the calandria plate 52. Holes 56 and 57 respectively labelled "C" and "D" identify the corresponding holes through the lower calandria plate 52 through which pass the RCC and the WDRC drive rods 56 and 57. Holes 52A are flow holes through the lower calandria plate 52, as likewise seen in FIG. 1A. FIG. 1C serves to illustrate the dense packing of the RCC and WDRC rod clusters and the geometrically interspersed arrays thereof within the upper internals 24 and, as well, the complexity of the structure within the calandria assembly 50.

Figure 2:
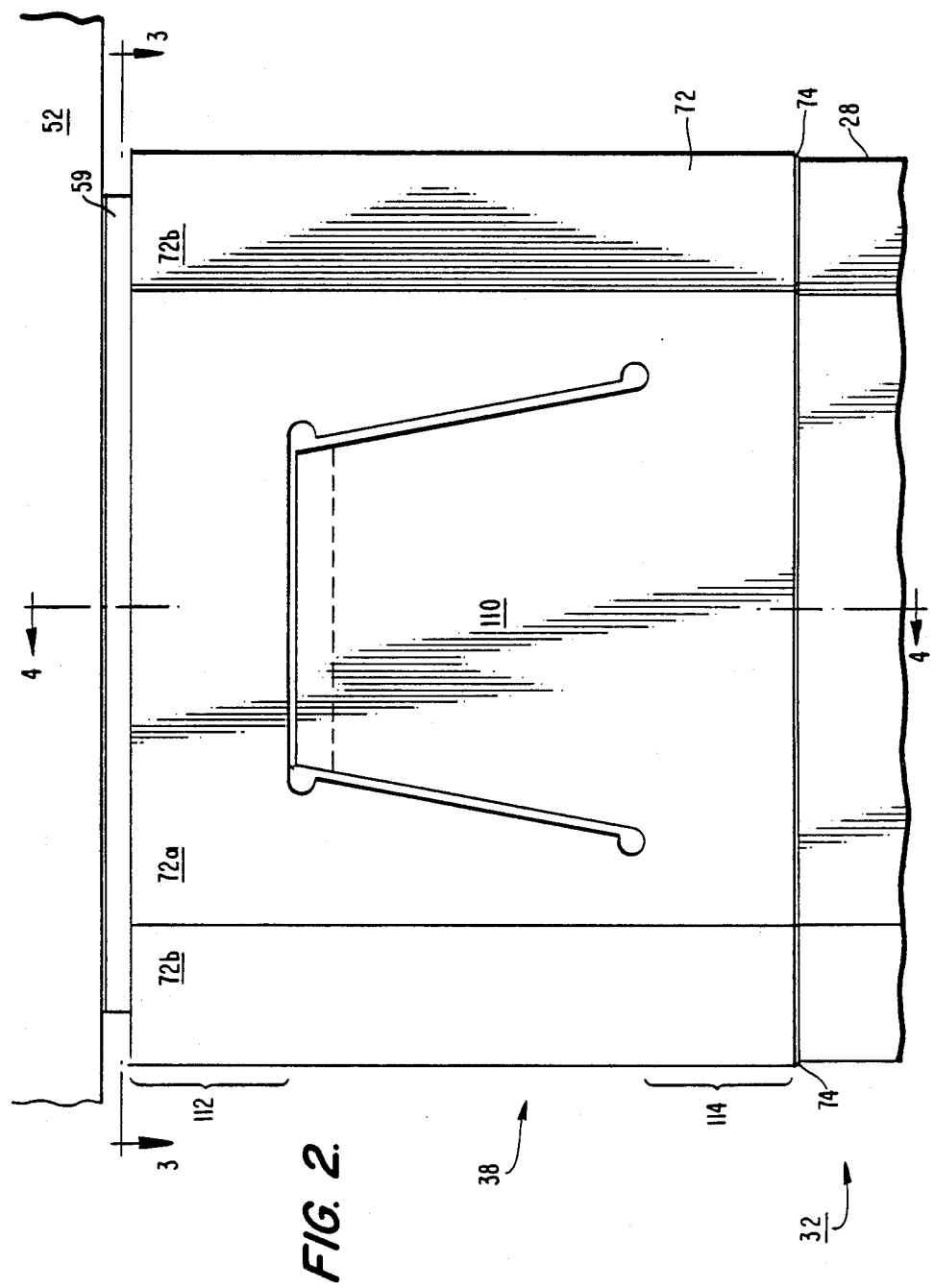
FIG. 2 is an enlarged and simplified elevational view of one of the frictionally loaded top end supports for WDRC rod guides as shown in FIG. 1A.
Figure 3:
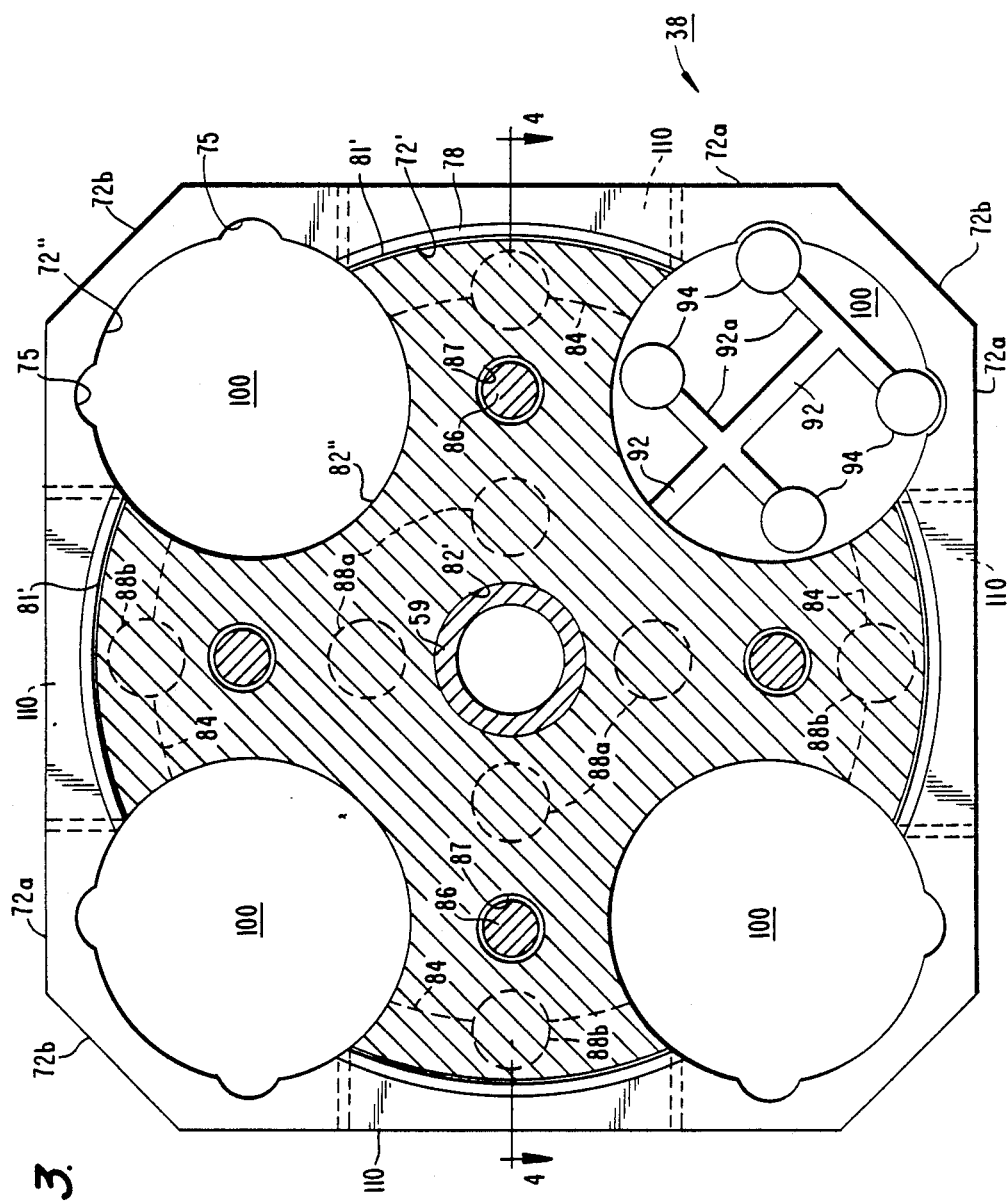
FIG. 3 is a planar, cross-sectional view, partially in schematic form, taken in a plane along the line 3—3 in FIG. 2.
Figure 4:
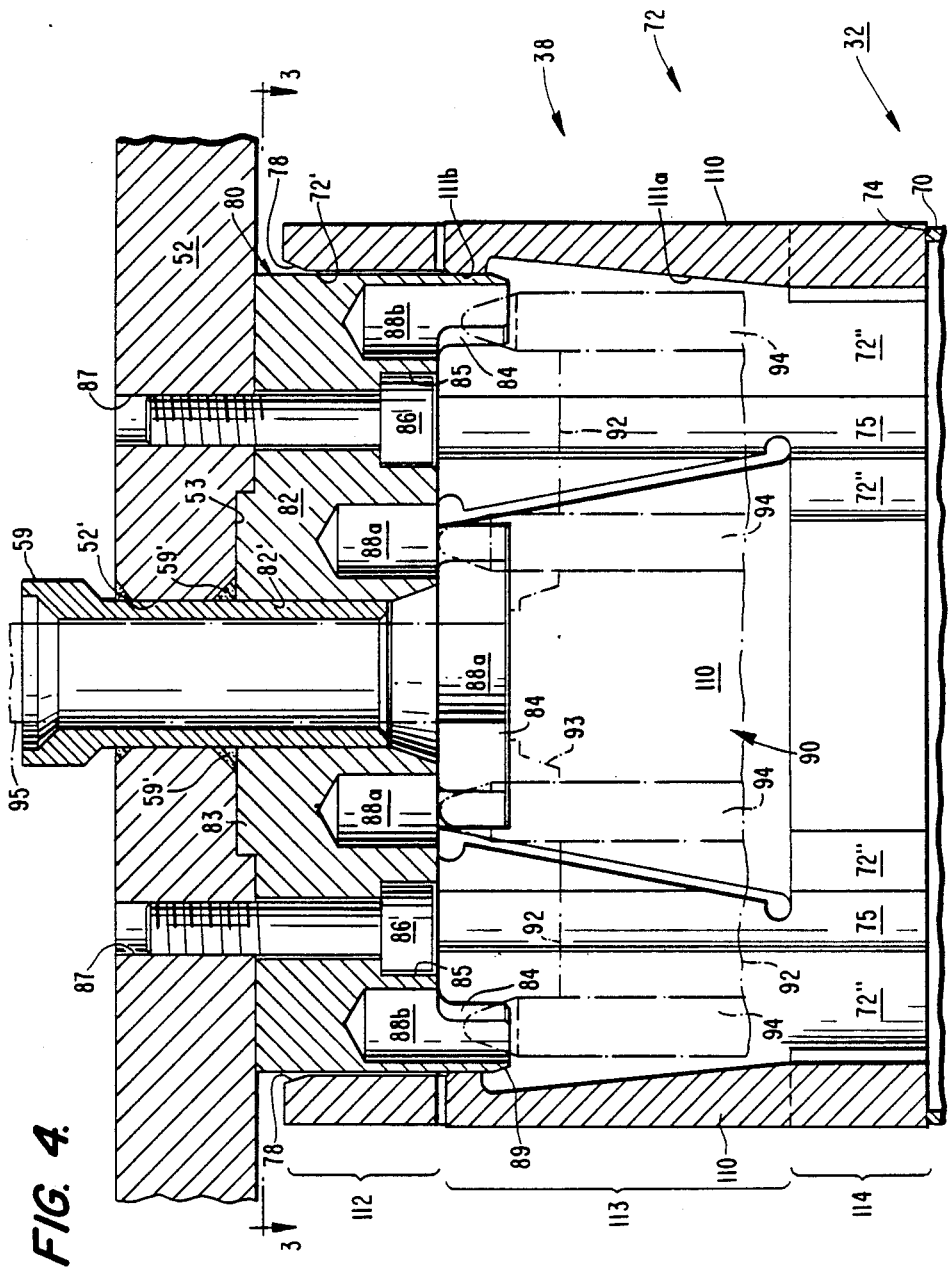
FIG. 4 is an elevational, cross-sectional view taken in a plane along the line 4—4 in FIG. 3.

The frictionally loaded top end support for cantilever-mounted water displacement rod guides of a pressurized water reactor in accordance with the present invention will be explained with concurrent reference to FIGS. 2, 3 and 4. FIG. 2 is an elevational view of the mounting means 38 comprising the frictionally loaded top end support for a WDRC rod guide 32. FIG. 3 is a cross-sectional view of the mounting means 38 taken along the line 3—3 in FIG. 2. FIG. 4 is a vertical cross-sectional view of the mounting means 38 taken along the lines 4—4 in each of FIGS. 2 and 3.

The WDRC rod guide 32, throughout substantially its entire axial length, comprises a relatively thin metal sidewall 70 of generally square cross-sectional configuration which carries, at its upper extremity, a reinforced, generally coaxial sleeve 72 having a generally square cross-sectional configuration corresponding to the outer perimeter of the thin sidewall 70 and which is permanently joined at its bottom end to the top end of the latter at their common outer perimeters, as illustrated by weld bead 74. The sleeve 72 receives in telescoping relationship therein a generally cylindrical, fixed support 80 comprising a cylindrical sidewall 81 and an end closure 82. The end closure 82 includes a central, annular projection 83 which is received within a corresponding annular recess 53 in the lower calandria plate 52, thereby interlocking the support 80 with the lower calandria plate 52 against lateral displacement. A central aperture 82' in the cylindrical support 80 is of a diameter corresponding to, and is aligned with, the aperture 52' in the lower calandria plate 52. A calandria extension 59 is received through the apertures 52', 82' and may extend downwardly through the aperture 82', serving to further stabilize the support 80 to the lower calandria plate 52. Typically, the calandria extension 59 is permanently secured to the lower calandria plate 52, as indicated by weld bead 59'.

Flow holes 100 are disposed in a symmetrical array about the axis of the calandria extension 59 associated with the WDRC rod guide 32 and its associated top end support 38, which must be unobstructed so as to permit unimpeded passage of the core output flow axially therethrough and into the calandria assembly 50. Accordingly, the end closure 82 includes a number of arcuate indentations, or recesses, 82" corresponding to the inner perimeter portions of the flow holes 100 adjacent the calandria extension 59. The cylindrical sidewall 81 of the fixed support 80 correspondingly is segmented, i.e., is discontinuous, and terminates at the corresponding perimeters of the flow holes 100 and thus comprises a plurality of arcuate segments 81', defining a plurality of arcuate flanges 84 (best seen in FIG. 3), each bounded at its opposite ends by the corresponding perimeters of the adjacent flow holes 100. The arcuate flanges 84 comprise the frictional load bearing components of the frictionally loaded top end support of the invention, as will be described. The end closure 82 furthermore includes a number of countersunk bores 85 through which bolts 86 are received and secured in tightly threaded engagement within the corresponding threaded bores 87 in the calandria lower plate 52. Inner cylindrical bores 88a and outer cylindrical bores 88b are optionally formed in the support 80 for a purpose to be described. As best seen in FIG. 3, the outer bores 88b may be centered at a radius slightly greater than the inner surface of the arcuate flanges 84.

The rod guide sleeve 72, as before noted, has an outer periphery of a predetermined geometric configuration corresponding substantially to that of the thin metal sidewall 70; particularly, it is of a eight-sided configuration, comprising two pairs of opposed major faces 72a and two pairs of opposed minor faces 72b. A leaf spring 110 is formed in each of the major faces 72a, in a central portion 113 which integrally connects an upper, continuous annular collar portion 112 and a lower, continuous annular base portion 114. Each leaf-spring 110 is machined so as to have a planar, interior surface 111a which is angled relative to the vertical outer surface and defines a tapered integral shank portion extending upwardly from the annular base portion 114, and an integral arcuate segment lip portion 111b. The arcuate segment lip portions 111b normally extend radially inwardly of the continuous annular collar portion 112. In the telescopingly assembled relationship with the fixed cylindrical support 80, the interior arcuate surface 72' of the sleeve 72 is annularly spaced from the exterior surfaces of the arcuate segments 81' of the cylindrical sidewall 81 of the fixed cylindrical support 80, whereas the arcuate segment lip portions 111b are frictionally loaded onto the annular flange extensions 84.

The rod guide sleeve 72 furthermore is machined so as to define an interior surface configuration which is in mating and complementary relationship with the exterior surface configuration of the cylindrical sidewall 81. As best seen in FIG. 3, the rod guide sleeve 72 includes plural interior arcuate surfaces 72' in mating relationship with the corresponding exterior surfaces of the arcuate segments 81' of the cylindrical sidewall 81, and generally arcuate recesses 72'' conforming to the corresponding outer perimeter portions of the flow holes 100 and complementing the arcuate recesses 82'' of the end closure 82 of the fixed support 80. Within each of the arcuate recesses 72'' there additionally are formed axially extending grooves 75, for a purpose to be explained.

Figure 5:
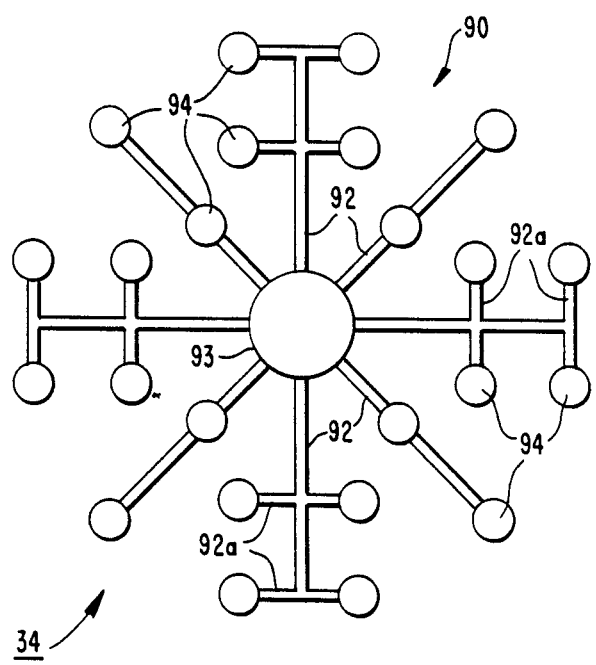
FIG. 5 is a simplified plan view of a WDRC rod cluster, as received within a WDRC rod guide.

FIG. 5 is a simplified, schematic plan view of the WDRC rod cluster 34, which more particularly comprises a spider 90 having a plurality of radially extending arms 92 connected to a central hub 93; further, alternate ones of the arms 92 include transverse cross-arms 92a. A plurality of WDRC rods 94 are appropriately connected to the arms 92 and the cross-arms 92a and depend therefrom in parallel axial relationship.

With concurrent reference to FIGS. 2 to 5, the grooves 75 and bores 88a, 88b are designed to accommodate respective, individual WDRC rods 94 when the cluster 34 is raised to a refueling position, as shown in phantom lines in FIG. 4. As shown by phantom lines as well in FIG. 3, the grooves 75 formed in the interior arcuate surface 72'' corresponding to a given flow hole 100 receive the respective rods 94 of an outer pair mounted on an outermost cross-bar 92, whereas the radially inner and outer bores 88a and 88b in the fixed support 80 accommodate the corresponding, radially inner and outer rods 94 mounted on the single radial arms 92. As shown by phantom lines in FIG. 4, a drive rod or drive shaft 95 is connected to the hub 93 of the spider 90 and extends upwardly through the calandria extension 59, as previously described, for raising or lowering the WDRC rod cluster 34 within its associated rod guide 32. The grooves 75 and the bores 88a and 88b avoid the necessity of increasing the height of the inner barrel assembly 24 in the event that adequate axial height is not available for permitting the cluster 34 to be raised to the required height during refueling. Where adequate vertical space is available, the grooves 75 and the bores 88a and 88b are not required, and accordingly are optional.

In accordance with the WDRC top end support 38 afforded by the present invention, during normal reactor operation, the radial load provided by the four leaf springs 110 prevents vibration of the sleeve 72 in a radial, or lateral, direction and thus maintains the spaced, concentric relationship of the sleeve 72 and the mount 80 and Specifically the nominal spacing of the respective, opposed arcuate surfaces 72' and 81' so as to avoid frictional wear therebetween. The axial friction load produced by the radial load, furthermore, prevents axial vibration of the rod guide 32 and, through the plurality of rod guides 32, vertical vibration of the core plate 19, as well. During abnormal load conditions, such as seismic and LOCA, in which the loading, or force, of the springs 110 is exceeded, the fixed cylindrical support 80 functions as a rigid abutment stop to the continuous annular collar portion 112 of the sleeve 72, and reacts any such abnormal load directly into the lower calandria plate 52. The frictional loaded top end support of the present invention therefore substantially eliminates any continuous frictional wear between the contiguous but nominally spaced surfaces of the sleeve 72 and the support 80, affording long life and reduced maintenance. Nevertheless, the support of the invention maintains the desirable feature of a telescoping interconnection of the sleeves 72 and the corresponding fixed cylindrical supports 80, which permits the calandria 50 to be raised and withdrawn for gaining access to the rod clusters 34 within the respective guides 32, for normal maintenance purposes, and thereafter reinstalled, simply by being lowered into position with the fixed mount and respective sleeves 72 axially aligned. To facilitate the installation, the inner upper edges 78 of the collar portion 112 are outwardly bevelled and the lower outer edge of the flanges 84 of the fixed support 80 are inwardly bevelled to facilitate the telescoping assembly; likewise, the arcuate segment lips 111b of the leaf springs 110 have arcuate cross-sectional configurations in a vertical plane passing therethrough, as shown in FIG. 4, for facilitating the telescoping interconnection during assembly.

In an actual pressurized water reactor of the advanced design herein contemplated and incorporating the present invention, the thin wall section 70 of the rod guide 32 is formed of sheet metal of approximately $\frac{1}{8}$ inch thickness. The rod guide 32 is approximately 12 inches wide, in both dimensions of its generally square cross-section, and approximately 174'' (14-$\frac{1}{2}$ feet) in height. The rod guide sleeve 72 has an outer periphery, in cross-section, corresponding to that of the rod guide 70, and may have a diagonal dimension between the opposed minor faces 72b of 14.8 inches and a transverse dimension between the opposed major faces 72a of 12.3 inches. The axial height of the sleeve 72 may be 9.0 inches, that of the collar portion 112 being somewhat over 2 inches, that of the leaf spring 110 being somewhat less than 5 inches and that of the lower annular base portion 114 being approximately 2 inches. To achieve the desired uniform spring deflection/loading force characteristics, the leaf spring 110 is tapered in its planar dimensions as seen in FIG. 2 from a base width of 6 inches to a width of somewhat over 4 inches at the lip portion 111b. An annular clearance of a nominal 0.007 inches is sufficient for the spacing between the cylindrical surface 81' of the fixed support 80 and the interior, mating surfaces 72' of the collar portion 112, the surfaces 72' lying on a diameter of approximately 11 inches. It furthermore is believed sufficient, to achieve the requisite radial loading of the springs 110, that the interior surfaces of the arcuate lip portions 111b lie on a diameter, in their nondeflected positions, which is at most several thousandths of an inch less than the diameter of the fixed cylindrical support 80. Further, it has been determined to be sufficient that the annular flanges 84 extend approximately 1 inch beyond the lower surface of the end closure 82 of the support 80 which in turn may be approximately 2.5 inches in axial height, or thickness. Further, the annular extension 83 and correspondingly the annular recess 53 may be of approximately 0.25 inches.

Figure 6:
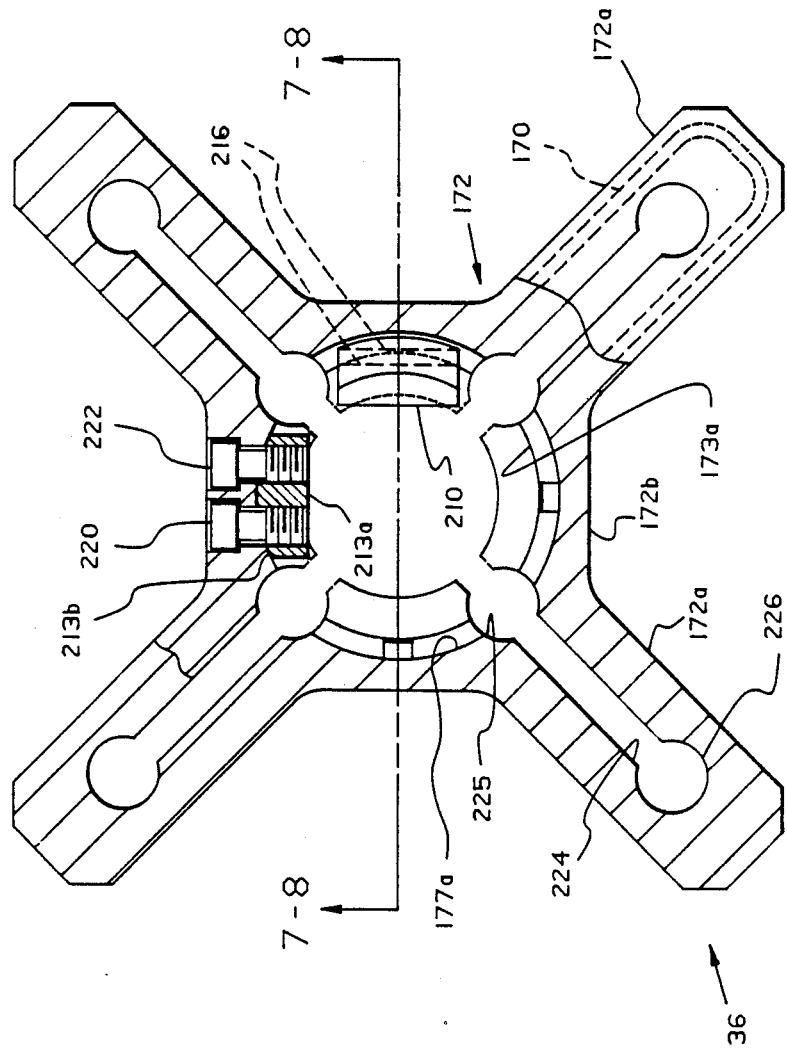
FIG. 6 is a top plan view of an RCC reinforced sleeve forming a part of the RCC top end support assembly.
Figure 7:
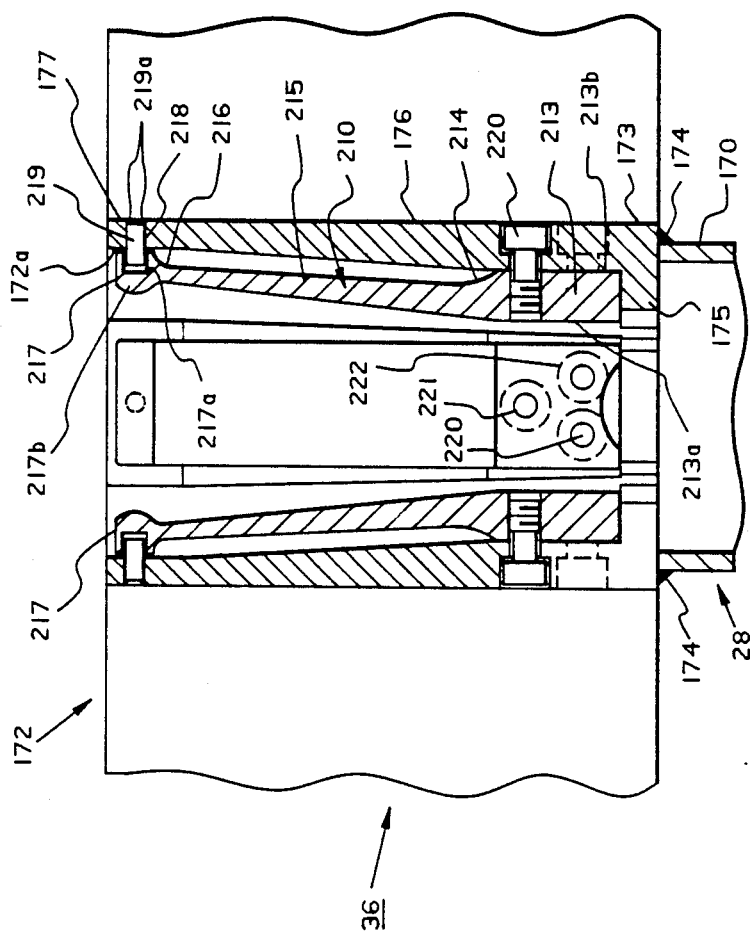
FIG. 7 is an elevational and cross sectional view, taken in a plane along line 7,8—7,8 in FIG. 6.
Figure 8:
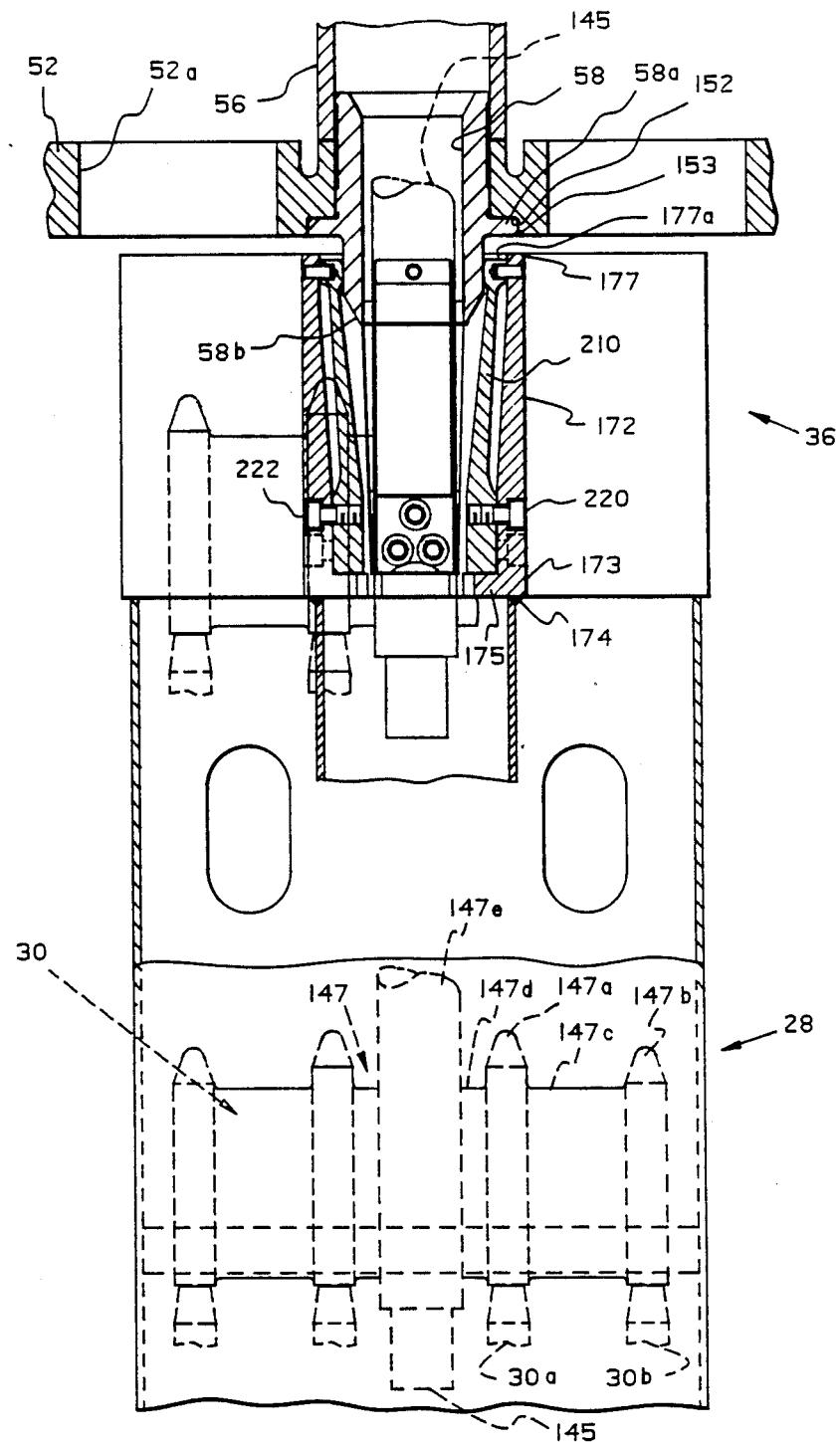
FIG. 8 is an elevational and cross-sectional view, partly in section and broken-away, of the RCC laterally loaded top end support, as assembled with an associated segment of a lower calandria plate, and its associated rod guide and RCC rod cluster.

FIG. 6 is a plan view of the reinforced sleeve for the RCC mounting means, or top end support 36, illustrating in hidden lines the corresponding configuration of the thin metal wall rod guide 28; FIG. 7 is a cross-sectional, elevational view taken in a plane through the line 7,8—7,8 in FIG. 6; and FIG. 8 is a cross-sectional view as in FIG. 7, of the assembled top end support 36 comprising the reinforced sleeve 172 with the calandria extension 58 received therein, the calandria extension 58 moreover being secured to the lower calandria plate 52. Reference is had concurrently thereto in the following.

The reinforced sleeve 172 is of a generally X-shaped cross-sectional configuration, as best seen in the plan view of FIG. 6, and is slightly larger in its lateral dimensions than the corresponding dimensions of the thin metal sidewall 170 of the RCC rod guide 28. The sleeve 172 thus has generally 90° displaced, radially oriented arms 172a defining therebetween an interior, or included vertex of truncated configuration defined by the short, interior face 172b. As seen in FIG. 1C, each interior vertex of sleeve 172 receives a corresponding exterior vertex of an adjacent WDRC sleeve 72, the interior face 172b being contiguous the corresponding minor face 72b, when in assembled relationship. The sleeve 172 is joined to the metal sidewall 170 for the rod guide 28 by a weld bead 174 (FIGS. 7 and 8).

The lower end 173 of the sleeve 172 comprises an annular base portion of fixed inner and outer diameters, the sidewalls tapering slightly in the axial upward direction to the upper end 177; further, annular flange 175 extends inwardly from the base portion 173 and defines an opening of an interior diameter sufficient to receive coaxially therethrough a drive rod 145 connected to a spider 147 to which the rods of the RCC rod cluster 30 are secured, the latter in conventional fashion. The upper end 177 of the sleeve 172 forms a continuous annular and non-yielding collar, the interior surface 177a comprising a load pick-up surface, as later described.

Leaf springs 210 are symmetrically disposed about the center axis of the support 172; in the preferred embodiment illustrated, four such leaf springs 210 are disposed at 90° displaced positions about the axis. The base portion 213 of each spring 210 has an inner, flat surface 213a and an outer, arcuate segment surface 213b which conforms to the generally cylindrical interior surface 173a of the lower portion 173 of sleeve 172, as best seen in the cut-away view of the topmost spring 210 in FIG. 6. Shank portion 215 of the spring 210 is joined through a compound curved and integral section 214 to the base portion 213 and thereafter is of tapered and rectangular cross-sectional configuration in the generally axial direction, in accordance with proper design for stress efficiency of a leaf spring. Integral neck portion 216 (the opposite edges of which are seen in the hidden lines in FIG. 6') joins shank 215 to an arcuate segment lip portion 217 (best seen in FIGS. 6 and 7). Bolts 220, 221 and 222 are received through corresponding apertures in the base portion 173 of the sleeve 172 and engaged in respective, threaded bores in the base portion 213 of the spring 210. A clearance bore 217a is formed in the lip portion 217, in alignment with and for receiving therein a retaining pin 219 which extends radially through hole 218 of the collar portion 177 of the sleeve 172 and is secured in position by a weld bead 219a.

With reference to the elevational and cross-sectional assembly drawing of FIG. 8, the RCC sleeve 172 is axially aligned with and receives therein the downwardly extending calandria extension 58. Flange 58a is received in an annular recess 152 in the lower calandria plate 52 and secured in position by weld bead 153. Tapered end surface 58b of the calandria extension 58 facilitates the alignment and telescoping insertion thereof into the generally axially aligned, cylindrical boundary defined by the interior surfaces 217b of the lip portions 217 of the springs 210. It will be understood that the annular gap between the calandria extension 58 and the load pick-up surface 177a of the collar portion 177 of sleeve 172 is slightly greater than the radial depth of the intervening lip portions 177, and that the latter normally exert a lateral, radially inward resilient force, produced by flexible shank 215, against the exterior surface of the calandria extension 58.

The lateral force of the leaf springs 210 serves to stabilize and maintain alignment of the sleeve 172 and thereby the RCC rod guide 28, as against the influences of flow-induced lateral loading during normal reactor operation, the frictional, axially oriented loading force as well serving to stabilize the RCC rod guide 28 against vertical displacement and in turn stabilizing the spaced relationship between the upper core plate 19 and the lower calandria plate 52. Excessive lateral forces acting on the RCC rod guide 28, as may occur during normal operating conditions or as a result of accident situations (seismic or LOCA) and which exceed the center biasing effect of the leaf springs 210, are transferred to the non-yielding, load pick-up surface 177a of the continuous annular collar portion 177 and directly through the intervening lip portion 217 of the correspondingly positioned leaf spring 210 to the calandria extension 58 and into the lower calandria plate 52.

As best seen in FIG. 6, and taken in conjunction with the broken-away and hidden view of the RCC rod cluster 30 in FIG. 8, the sleeve 172 is configured internally to permit telescoping passage therethrough of the RCC rod cluster 30 including the RCC spider 147 which is connected to drive rod 145 and the associated RCC control rods; more particularly, the sleeve 172 includes passageways 224 extending radially from the axis and centrally of the arms 172a, having rounded openings 225 and 226 respectively corresponding to the vanes 147c and 147d and the mounting hubs 147a and 147b for the respective, radially displaced RCC rods 30a and 30b, the vanes being connected to a central hub 147e of the RCC spider 147 mounted on the drive rod 145. Thus, when the calandria 50 is removed from an engaged position with the sleeve 172, the corresponding RCC cluster 30 may be withdrawn vertically and in sliding, telescoping relationship relatively to the RCC rod guide 28 and through the sleeve 172, without requiring any disassembly of the latter.

As noted, the RCC top end supports 36 are less massive than the WDRC top end supports 38, as is permissible in view of the smaller lateral forces which must be reacted thereby. On the other hand, the smaller spatial envelope presents alternative design constraints. By way of comparison, the height of the RCC sleeve 172 may be approximately 7.25 inches and the cross-sectional width of the central portion, as seen in cross-section in FIG. 8, approximately 4.75 inches. The width of the arms 172a may be 1.75 inches and the radial length thereof, from the central axis, 6.25 inches. The leaf springs 210 may have a height of approximately 6.6 inches, the shank portion 215 tapering from 0.45 inches to approximately 0.20 inches adjacent the arcuate lip portion 217. The sidewall of the sleeve 172 tapers outwardly from an interior diameter of approximately 3.5 inches at the bottom to 4 inches at the top, thereby affording the clearance gap relative to the calandria extension 58, the latter having an outer diameter of approximately 3 inches, within which gap the arcuate segment lip portions 217 of the leaf spring are received.

The specific configuration and structural dimensions of the WDRC and RCC top end supports as provided hereinabove are significant, in that they establish the capability of achieving a practical implementation in accordance with the design configurations as set forth herein, despite the extremely limited spatial envelope available therefor within the reactor internals, taking further into account the necessity of accommodating the requisite flow passages and the like. While of relatively low size, they afford the necessary structural strength for reacting both axial and transverse loading forces and yet are compliant for ease of performing assembly and disassembly operations. Nevertheless, they are of reduced complexity, affording reduced costs of manufacture and installation.

Numerous modifications and adaptations of the present invention will be apparent to those of skill in the art and thus it is intended by the appended claims to cover all such modifications and adaptations as fall within the true spirit and scope of the invention.

We claim as our invention:

1. A frictionally loaded top end support for each of plural rod guides disposed in closely spaced, parallel axial relationship within the inner barrel assembly of a pressurized water reactor vessel, the inner barrel assembly occupying a central portion of the vessel and being of a vertical height extending from a first plate of lower elevation to a second plate of higher elevation within the vessel, said second plate being moveable axially into and out of assembled relationship with the inner barrel assembly, each said rod guide having a thin sidewall portion of elongated configuration and being of an axial length corresponding substantially to the vertical height of said inner barrel assembly and mounted at the lower end thereof to the first plate for accommodating in axial, sliding relationship therewithin a respectively associated cluster of elongated rods, said frictionally loaded top end support comprising, for each said rod guide:

a fixed, generally cylindrical support having an upper end closure adapted for being secured to the lower surface of the second plate and having an integral depending sidewall of generally cylindrical configuration;

means for securing said fixed cylindrical support to the second plate;

an axially extending sleeve, comprising lower and upper axial portions of continuous, annular configuration integrally joined by a central portion, affixed at a lower end thereof to the upper end of the associated thin sidewall of said rod guide and having a generally cylindrical interior surface and being of an axial length for telescopingly receiving said fixed cylindrical support and disposing the upper end of said sleeve closely adjacent to but displaced from the lower surface of the second plate when in the assembled relationship; and a plurality of leaf springs formed at angularly displaced positions in said central portion of said sleeve, each extending axially and integrally from said lower portion of said sleeve and having a free end adjacent said upper portion of said sleeve, the free ends of said leaf springs defining interior arcuate segments lying on a diameter less than the diameter of said sidewall of said associated, fixed cylindrical support and being engaged thereby for resiliently, outwardly deflecting said leaf spring in said assembled relationship, and said leaf springs producing frictional loading on said fixed cylindrical support sufficient to maintain alignment of said associated sleeve and fixed cylindrical support with said upper annular portion nominally, concentrically spaced from said sidewall of said fixed cylindrical support.

2. A top end support as recited in claim 1, wherein:
said axially extending sleeve has an outer surface defining at least first and second pairs of parallel, major surfaces; and
said plurality of leaf springs is formed in the respective said major surfaces of said sleeve.

3. A top end support as recited in claim 2, wherein:
each said leaf spring comprises a planar, interior surface which is angled relative to said associated, outer, major surface so as to define a tapered integral shank portion extending upwardly from the annular lower portion of said sleeve 4. A top end support as recited in claim 3, wherein said interior arcuate segment of each said leaf spring further comprises:
an integral arcuate segment lip portion extending radially inwardly at the upper end of said integral shank portion.

5. A top end support as recited in claim 3, wherein said integral shank portion of each said leaf spring, in the plane of said associated, outer major surface, is of a decreasing width dimension extending from the lower end thereof integral with said annular lower portion of said sleeve to the upper, free end of said leaf spring 6. A top end support as recited in claim 1, wherein:
said upper end of said sleeve on said interior, generally cylindrical surface thereof includes a radially outward bevel; and
said lower end of said cylindrical sidewall of said fixed cylindrical support on said outer circumferential surface thereof includes a radially inward bevel;
said radially outward and radially inward bevels facilitating the telescoping assembly of said fixed cylindrical support and said sleeve.

7. A top end support as recited in claim 1, further comprising:
an array of depending, generally cylindrical extensions respectively corresponding to said plurality of rod guides, each said extension being rigidly secured to the second plate and extending axially downwardly therefrom; and
a central aperture extending axially through said end closure of each said fixed cylindrical support for telescopingly receiving a respectively corresponding said extension therein, thereby to maintain a predetermined, aligned position of each corresponding, said fixed cylindrical support relative to the second plate and thus within said inner barrel assembly.

8. A top end support as recited in claim 7, wherein each said securing means comprises:
a plurality of bores disposed symmetrically about said central aperture and extending in parallel axial relationship through said end closure and a plurality of respectively corresponding, aligned threaded bores in the second plate; and
bolts received through said bores in said end closure and engaging the respective, aligned threaded bores in the second plate for securing said cylindrical support thereto.

9. A top end support as recited in claim 7, wherein there is further provided:
a plurality of apertures in said second plate corresponding to and respectively receiving therethrough said generally cylindrical extensions.

10. A top end support as recited in claim 9, further comprising:
an array of flow holes disposed in a predetermined pattern about each of said apertures in said second plate and corresponding to a respectively associated rod guide;
each said rod guide being of sufficient cross-sectional dimensions so as to encompass therewithin, throughout the height of the inner barrel assembly, the spatial area of the associated flow holes, the interior surface of each said sleeve including an arcuate recess therein corresponding to an outer portion of the periphery of each said flow hole and said end closure of said cylindrical support including an arcuate recess aligned with and corresponding to the remaining peripheral portion of each of said respectively associated flow holes, said respectively aligned recesses defining flow holes corresponding to the flow holes of the predetermined pattern in the second plate;
said cylindrical sidewall of each said fixed cylindrical support being discontinuous at said recesses corresponding to the peripheries of each of said flow holes so as to comprise a plurality of arcuate flanges extending intermediate successive said respectively associated flow holes; and
said plurality of leaf springs respectively corresponding to and resiliently engaging said arcuate flanges.

11. A pressurized water reactor vessel having, in vertically spaced relationship therein, a lower barrel assembly having lower and upper core plates and a plurality of elongated fuel rod clusters mounted between said lower and upper core plates so as to extend in parallel axial relationship therebetween, an inner barrel assembly positioned above said lower barrel assembly and housing therewithin a plurality of rod guides of elongated configuration disposed in parallel axial relationship and affixed at the respective lower ends thereof to the upper core plate, each said rod guide having a thin sidewall portion of elongated configuration and being of an axial length corresponding substantially to the vertical height of said inner barrel assembly, and a calandria assembly having a lower calandria plate and being axially moveable into and out of assembled relationship with the inner barrel assembly, the lower calandria plate being disposed closely adjacent the upper ends of said rod guides when in assembled relationship with the inner barrel assembly, and means at the interface between the lower calandria plate and the upper ends of said rod guides for mounting the top ends of said rod guides to the lower calandria plate when the calandria assembly is assembled with the inner barrel assembly, comprising:
a fixed, generally cylindrical support having an upper end closure adapted for being secured to the lower surface of the lower calandria plate and having an integral depending sidewall of generally cylindrical configuration;
means for securing said fixed cylindrical support to the lower calandria plate;
an axially extending sleeve, comprising lower and upper axial portions of continuous, annular configuration integrally joined by a central portion, affixed at a lower end thereof to the upper end of the associated thin sidewall of said rod guide and having a generally cylindrical interior surface and being of an axial length for telescopingly receiving said fixed cylindrical support and disposing the upper end of said sleeve closely adjacent to but displaced from the lower surface of the lower calandria plate when in the assembled relationship; and
a plurality of leaf springs formed at angularly displaced positions in said central portion of said sleeve, each extending axially and integrally from said lower portion of said sleeve and having a free end adjacent said upper portion of said sleeve, the free ends of said leaf springs defining interior arcuate segments lying on a diameter less than the diameter of said sidewall of said associated, fixed cylindrical support and being engaged thereby for resiliently, outwardly deflecting said leaf spring in said assembled relationship, and said leaf springs producing frictional loading on said fixed cylindrical support sufficient to maintain alignment of said associated sleeve and fixed cylindrical support with said upper annular portion nominally, concentrically spaced from said sidewall of said fixed cylindrical support.

12. A pressurized water reactor vessel as recited in claim 11, wherein:
said axially extending sleeve has an outer surface defining at least first and second pairs of parallel, major surfaces; and
said plurality of leaf springs is formed in the respective said major surfaces of said sleeve.

13. A pressurized water reactor vessel as recited in claim 12, wherein:
each said leaf spring comprises a planar, interior surface which is angled relative to said associated, outer, major surface so as to define a tapered integral shank portion extending upwardly from the annular lower portion of said sleeve.

14. A pressurized water reactor vessel as recited in claim 13, wherein said interior arcuate segment of each said leaf spring further comprises:
an integral arcuate segment lip portion extending radially inwardly at the upper end of said integral shank portion.

15. A pressurized water reactor vessel as recited in claim 13, wherein said integral shank portion of each said leaf spring, in the plane of said associated, outer major surface is of a decreasing width dimension extending from the lower end thereof integral with said annular lower portion of said sleeve to the upper, free end of said leaf spring.

16. A pressurized water reactor vessel as recited in claim 11, wherein:

said upper end of said sleeve on said interior, generally cylindrical surface thereof includes a radially outward bevel; and said lower end of said cylindrical sidewall of said fixed cylindrical support on said outer circumferential surface thereof includes a radially inward bevel;

said radially outward and radially inward bevels facilitating the telescoping assembly of said fixed cylindrical support and said sleeve.

17. A pressurized water reactor vessel as recited in claim 11, further comprising:

an array of depending, generally cylindrical extensions respectively corresponding to said plurality of rod guides, each said extension being rigidly secured to the lower calandria plate and extending axially downwardly therefrom; and a central aperture extending axially through said end closure of each said fixed cylindrical support for telescopingly receiving a respectively corresponding said downward extension therein, thereby to maintain a predetermined, aligned position of each corresponding, said fixed cylindrical support relative to the lower calandria plate and thus within said inner barrel assembly.

18. A pressurized water reactor vessel as recited in claim 17, wherein each said securing means comprises:

a plurality of bores disposed symmetrically about said central aperture and extending in parallel axial relationship through said end closure and a plurality of respectively corresponding, aligned threaded bores in the lower calandria plate; and bolts received through said bores in said end closure and engaging the respective, aligned threaded bores in the lower calandria plate for securing said cylindrical support thereto.

19. A pressurized water reactor vessel as recited in claim 17, wherein there is further provided:

a plurality of apertures in said lower calandria plate corresponding to and respectively receiving therethrough said generally cylindrical extensions.

20. A pressurized water reactor vessel as recited in claim 19, further comprising:

an array of flow holes disposed in a predetermined pattern about each of said apertures in said lower calandria plate and corresponding to a respectively associated rod guide;

each said rod guide being of sufficient cross-sectional dimension so as to encompass therewithin, throughout the height of the inner barrel assembly, the spatial area of the associated flow holes, the interior surface of each said sleeve including an arcuate recess therein corresponding to an outer portion of the periphery of each said flow hole and said end closure of said cylindrical support including an arcuate recess aligned with and corresponding to the remaining peripheral portion of each of said respectively associated flow holes, said respectively aligned recesses defining flow holes corresponding to the flow holes of the predetermined pattern in the lower calandria plate;

said cylindrical sidewall of each said fixed cylindrical support being discontinuous at said recesses corresponding to the peripheries of each of said flow holes so as to comprise a plurality of arcuate flanges extending intermediate successive said respectively associated flow holes; and said plurality of leaf springs respectively corresponding to and resiliently engaging said arcuated flanges.

21. A frictionally, resiliently loaded top end support for each of plural rod guides disposed in closely spaced, parallel axial relationship within the inner barrel assembly of a pressurized water reactor vessel, the inner barrel assembly occupying a central portion of the vessel and being of a vertical height extending from a first plate of lower elevation to a second plate of higher elevation within the vessel, said second plate being moveable axially into and out of assembled relationship with the inner barrel assembly, each said rod guide having a thin sidewall portion of elongated configuration and being of an axial length corresponding substantially to the vertical height of said inner barrel assembly and mounted at the lower end thereof to the first plate for accomodating in axial, sliding relationship therewithin a respectively associated cluster of elongated rods, said frictionally loaded top end support comprising, for each said rod guide:

a support adapted for being secured to the second plate and to depend axially downwardly therefrom and define an alignment axis for said associated rod guide within the inner barrel assembly;

means for securing the support to the second plate;

an axially extending sleeve affixed at a lower end thereof to the upper end of the thin sidewall of said associated rod guide and having a central, axially extending opening therein for telescopingly receiving said fixed support and being of an axial length for disposing the upper end of said sleeve closely adjacent to but displaced from the lower surface of the second plate when in the assembled relationship; and resilient means extending axially upwardly from a lower portion of said sleeve and radially inwardly for resiliently engaging said support and thereby releasably interconnecting said sleeve and said support, said resilient means, in the assembled relationship, producing both radially oriented resilient loading between said sleeve and said support for maintaining said associated sleeve and rod guide aligned with said alignment axis and axially oriented frictional loading for opposing axial movement of said sleeve relative to the second plate.

22. A frictionally loaded top end support as recited in claim 21, wherein said resilient means comprise plural, axially extending leaf springs disposed at angularly displaced positions about the alignment axis, normally positioned relatively to the alignment axis so as to be resiliently deflected by said support in the assembled relationship and thereby produce the radially oriented resilient loading and the axially oriented frictional loading.

23. A frictionally loaded top end support as recited in claim 22, wherein said plural axially extending leaf springs are formed integrally in said sleeve, each said leaf spring comprising a flexible shank portion extending integrally from the lower portion of said sleeve, axially upwardly to a free end, said free ends of said leaf spring being biased normally radially inwardly relative to the alignment axis by said associated flexible shank portions for resiliently and frictionally engaging said support in the assembled relationship.

24. A frictionally loaded top end support as recited in claim 22, wherein:

said support comprises a depending sidewall of generally cylindrical configuration;

said axially extending sleeve comprises a sidewall defining a generally cylindrical interior surface for receiving said support in telescoping relationship and comprising lower and upper sidewall portions, each of continuous, generally annular configuration and a central sidewall portion integrally joining said lower and upper sidewall portions; and said plural, axially extending leaf springs are formed in said central sidewall portion of said sleeve, each spring comprising a flexible shank portion integrally joined to said lower sidewall portion of said sleeve and extending axially upwardly to a free end adjacent said upper annular sidewall portion of said sleeve, each said free end defining an interior arcuate segment and being biased normally radially inwardly of said upper annular sidewall portion by said flexible shank portion so as to resiliently, frictionally engage a corresponding surface portion of said depending cylindrical sidewall of said support in the assembled relationship.

25. A frictionally loaded top end support as recited in claim 24, wherein:

said axially extending sleeve has a generally square exterior surface comprising four 90° displaced major faces; and four said axially extending leaf springs are formed in said central sidewall portion of said sleeve in respective said major faces thereof.

26. A frictionally loaded top end support as recited in claim 22, wherein:

said support further comprises an end wall closure adapted for being secured to the second support plate and having a central aperture therein, and a generally cylindrical extension received through the aperture in said end wall closure and a corresponding aperture in the second plate and rigidly secured to the second plate; and there are further provided plural passageways displaced radially from said alignment axis and extending in parallel axial relationship with the alignment axis along the interior surface of said axially extending sleeve, said passageways corresponding in cross-section to the outer periphery of the cross-section of a respectively associated rod cluster for permitting telescoping, axial movement of an associated rod cluster through said sleeve, selectively into and out of the associated thin sidewall portion of the rod guide in the disassembled relationship of the second plate and the inner barrel assembly.

27. A frictionally loaded top end support as recited in claim 26, further comprising:

plural flow holes equiangularly displaced about the alignment axis and extending in parallel axial relationship therewith through the end wall closure of said support, in alignment with corresponding flow holes in the second plate.

28. A frictionally loaded top end support as recited in claim 22, wherein:

said support defines a depending sidewall of generally cylindrical configuration;

said axially extending sleeve comprises a sidewall defining a generally cylindrical interior surface for receiving said support in telescoping relationship with an annular gap therebetween and comprising lower and upper equiangularly displaced sidewall segments having interior arcuate segment surfaces corresponding to said plural leaf springs and corresponding central sidewall segments integrally joining said lower and upper sidewall segments; and said plural, axially extending leaf springs are disposed within the generally cylindrical interior surface of said axially extending sleeve at equiangularly displaced positions therein corresponding to said sidewall segments, each leaf spring comprising a base portion having an outer, arcuate segment surface received against the interior arcuate segment surface of a corresponding lower sidewall segment and secured thereto, an arcuate segment lip portion disposed in the annular gap between said support and the interior arcuate segment surface of the corresponding upper sidewall segment, and a flexible shank portion integrally joining said base and lip portions, and said arcuate segment lip portions of said springs being biased normally radially inwardly of said corresponding upper sidewall segments by said flexible shank portions so as to resiliently, frictionally engage corresponding surface portions of said support in the assembled relationship.

29. A frictionally loaded top end support as recited in claim 28, further comprising:

a clearance hole extending radially inwardly and partially through each arcuate segment lip portion;

a hole in each said upper sidewall segment aligned with the clearance hole in the arcuate segment lip portion of said corresponding leaf spring; and a retaining pin extending through said aligned holes and secured to said upper sidewall segment for permitting radial movement of the arcuate segment lip portion of the associated leaf spring while retaining same against axial displacement in the event of breakage of the shank portion of the spring.

30. A frictionally loaded top end support as recited in claim 29, wherein:

said axially extending sleeve has a generally X-shaped exterior surface comprising four 90° displaced arms; and each of said 90° displaced arms integrally interconnects the adjacent, equiangularly displaced lower, central and upper sidewall segments.

31. A frictionally loaded top end support as recited in claim 30, wherein said axially extending sleeve further comprises:

plural, radially displaced holes and radial passageways interconnecting said holes, extending radially from said generally cylindrical interior surface of said sleeve and in parallel axial relationship through said arms, said holes and passageways corresponding in cross-section to the cross-section of a respectively associated rod cluster, for permitting telescoping, axial movement of an associated rod cluster through said sleeve, selectively into and out of the associated thin sidewall portion of the rod guide in the disassembled relationship of the second plate and the inner barrel assembly.

32. A pressurized water reactor vessel having frictionally, resiliently loaded top end supports for each of respective, plural RCC and WDRC rod guides disposed in closely spaced, parallel axial relationship within the inner barrel assembly of the vessel, the inner barrel assembly occupying a central portion of the vessel and being of a vertical height extending from a first plate of lower elevation to a second plate of higher elevation within the vessel, said second plate being moveable axially into and out of assembled relationship with the inner barrel assembly, each said RCC and WDRC rod guide having a thin sidewall portion of elongated configuration and being of an axial length corresponding substantially to the vertical height of said inner barrel assembly and mounted at the lower end thereof to the first plate for accommodating in axial, sliding relationship therewithin respectively associated RCC and WDRC clusters of elongated rods, said frictionally loaded RCC and WDRC top end supports comprising, for each of said respective RCC and WDRC rod guides:

a support adapted for being secured to the second plate and to depend axially downwardly therefrom and define an alignment axis for said associated rod guide within the inner barrel assembly;

an axially extending sleeve affixed at a lower end thereof to the upper end of the thin sidewall of said associated rod guide and having a central, axially extending opening therein for telescopingly receiving said fixed support and being of an axial length for disposing the upper end of said sleeve closely adjacent to but displaced from the lower surface of the second plate when in the assembled relationship;

said WDRC support further comprising a depending sidewall of generally cylindrical configuration and an integral end wall closure adapted for being secured to the second support plate and having a central aperture therein, and a generally cylindrical extension received through the aperture in said end wall closure and a corresponding aperture in the second plate and rigidly secured to the second plate;

each said WDRC axially extending sleeve further comprising a sidewall having a generally square exterior surface comprising four 90° displaced major faces and defining a generally cylindrical interior surface for receiving said WDRC support in telescoping relationship and comprising lower and upper sidewall portions, each of continuous, generally annular configuration and a central sidewall portion integrally joining said lower and upper sidewall portions, axially extending leaf springs formed in said central sidewall portion of said sleeve in respective said major faces thereof, each spring comprising a flexible shank portion integrally joined to said lower sidewall portion of said sleeve and extending axially upwardly to a free end adjacent said upper annular sidewall portion of said sleeve, each said free end defining an interior arcuate segment and being biased normally radially inwardly of said upper annular sidewall portion by said flexible shank portion so as to resiliently, frictionally engage a corresponding surface portion of said depending cylindrical sidewall of said support in the assembled relationship;

said RCC support comprises a generally cylindrical extension received through an aperture in the second plate and rigidly secured thereto; and each said axially extending RCC sleeve has a generally X-shaped exterior surface and comprises a sidewall defining a generally cylindrical interior surface for receiving said RCC support in telescoping relationship with an annular gap therebetween and comprising lower and upper equiangularly displaced sidewall segments having interior arcuate segment surfaces and corresponding central sidewall segments integrally joining said lower and upper sidewall segments and four 90° displaced arms, each arm integrally interconnecting the adjacent equiangularly displaced lower, central and upper sidewall segments, and plural, axially extending leaf springs disposed within the generally cylindrical interior surface of said axially extending sleeve at equiangularly displaced positions therein corresponding to said sidewall segments, each leaf spring comprising a base portion having an outer, arcuate segment surface received against the interior arcuate segment surface of a corresponding lower sidewall segment and secured thereto, an arcuate segment lip portion disposed in the annular gap between said RCC support and the interior arcuate segment surface of the corresponding upper sidewall segment, and a flexible shank portion integrally joining said base and lip portions, and said arcuate segment lip portions of said springs being biased normally radially inwardly of said corresponding upper sidewall segments by said flexible shank portions so as to resiliently, frictionally engage corresponding surface portions of said RRR support in the assembled relationship.

33. A pressure vessel as recited in claim 32, wherein: there are further provided in the end closure of each WDRC support, plural passageways displaced radially from said alignment axis and extending in parallel axial relationship with the alignment axis along the interior surface of said axially extending sleeve, said passageways corresponding in cross-section to the outer periphery of the cross-section of a respectively associated rod cluster for permitting telescoping, axial movement of an associated rod cluster through said sleeve, selectively into and out of the associated thin sidewall portion of the rod guide in the disassembled relationship of the second plate and the inner barrel assembly.

34. A pressure vessel as recited in claim 33, further comprising:

plural flow holes equiangularly displaced about the alignment axis and extending in parallel axial relationship therewith through the end wall closure of said WDRC support, in alignment with corresponding flow holes in the second plate.

35. A pressure vessel as recited in claim 32, wherein each RCC top end support further comprises:

a clearance hole extending radially inwardly and partially through each arcuate segment lip portion, a hole in each said upper sidewall segment aligned with the clearance hole in the arcuate segment lip portion of said corresponding leaf spring, and a retaining pin extending through said aligned holes and secured to said upper sidewall segment for permitting radial movement of the arcuate segment lip portion of the associated leaf spring while retaining same against axial displacement in the event of breakage of the shank portion of the spring.

36. A pressure vessel as recited in claim 35, wherein each said axially extending RCC sleeve further comprises:

plural, radially displaced holes and radial passageways interconnecting said holes, extending radially from said generally cylindrical interior surface of said sleeve and in parallel axial relationship through said arms, said holes and passageways corresponding in cross-section to the cross-section of a respectively associated rod cluster, for permitting telescoping, axial movement of an associated rod cluster through said sleeve, selectively into and out of the associated thin sidewall portion of the rod guide in the disassembled relationship of the second plate and the inner barrel assembly.

* * * * *